US007907156B2

(12) United States Patent
Todorokihara et al.

(10) Patent No.: US 7,907,156 B2
(45) Date of Patent: Mar. 15, 2011

(54) DISPLAY DEVICE AND ELECTRONIC PAPER

(75) Inventors: Masayoshi Todorokihara, Fujimi-machi (JP); Eiju Hirai, Fujimi-machi (JP); Yuko Komatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 683 days.

(21) Appl. No.: 12/021,489

(22) Filed: Jan. 29, 2008

(65) Prior Publication Data

US 2008/0186259 A1    Aug. 7, 2008

(30) Foreign Application Priority Data

Feb. 2, 2007  (JP) ................................ 2007-024407

(51) Int. Cl.
*G09G 5/10*    (2006.01)
(52) U.S. Cl. ........... 345/690; 345/694; 345/88; 345/107; 345/173
(58) Field of Classification Search .................. 345/83, 345/84.87, 88, 89, 107, 173, 690, 694
See application file for complete search history.

(56) References Cited

U.S. PATENT DOCUMENTS

| 7,023,407 | B2 * | 4/2006 | Nakanishi | 345/76 |
| 7,268,792 | B2 * | 9/2007 | Lee et al. | 345/694 |
| 7,742,041 | B2 * | 6/2010 | Lee et al. | 345/173 |

FOREIGN PATENT DOCUMENTS

JP    A 2003-223272    8/2003

* cited by examiner

*Primary Examiner* — Quan-Zhen Wang
*Assistant Examiner* — Sepideh Ghafari
(74) *Attorney, Agent, or Firm* — Oliff & Berridge PLC

(57) ABSTRACT

A display device for an active matrix drive includes a plurality of pixels each having display retainability and including a first sub-pixel through an nth sub-pixel (n is a natural number greater than 1), a selection switching element provided correspondingly to each of the sub-pixels, connected to a data line, and for selecting the corresponding sub-pixel, and an external input switch provided correspondingly to each of the sub-pixels, connected to a selection line, and for supplying a signal from the selection line to the corresponding sub-pixel in response to an input operation from the outside. The selection line includes n kinds of selection lines, from a first selection line connected to the first sub-pixel to an nth selection line connected to the nth sub-pixel, and the n kinds of selection lines are connected to selection switches for one of selecting the selection lines individually and selecting two or more of the selection lines in a lump.

7 Claims, 12 Drawing Sheets

DISPLAY DEVICE AND ELECTRONIC PAPER

The entire disclosure of Japanese Patent Application No. 2007-024407, filed Feb. 2, 2007 is expressly incorporated by reference herein.

BACKGROUND OF THE INTENTION

1. Technical Field

The present invention relates to a display device having a function of performing display in response to a direct input and to an electric paper.

2. Related Art

In recent years, display devices using various electro-optic materials such as liquid crystal materials or electrophoretic materials have been provided.

Further, in the past, a digitizing tablet (a digitizing device) for a display panel (a display device) using, for example, a light emitting diode has been proposed (see, e.g., JP-A-2003-223272). It should be noted that as the digitizing device some types are known, as disclosed in the document mentioned above as related art.

A digitizing device is arranged to allow the user to directly input data on a lattice by writing a character or a diagram, or designating a position of a stylus on a digitizer array. Specifically, such types are described below are known.

1. A type of making a tip portion of a stylus have a direct contact with a capacitive-resistive array.

2. A type of allowing the user to input data, and using an electromagnetic digitizer interacting with a stylus having a magnetic tip structure or an electromagnetic field generating stylus when performing a desired operation.

3. A type formed of a stylus equipped with an RF transmitter for transmitting a signal to a digitizing array.

4. A type having a light source built-in, such as a visible light source or an infrared light source disposed inside a tip of a stylus so that the light is reflected by a pad.

Such a digitizing device is directly provided to a monitor as a display device, or separately provided from the monitor. In general, the digitizing device requiring a larger working surface compared to the size of the display device is provided separately from the display device, or in the case in which portability or compactness is required, the digitizing device is directly built into the display device to form an integrated digitizing device.

Incidentally, in the digitizing device or the display device equipped integrally with the digitizing device described above, it is difficult, in principle, to correspond to upsizing thereof because the processing speed is proportional to the performance of a processor, and further, it is also difficult to achieve low power consumption because the power is also required in the standby state. Further, there is a demand for capability of displaying an underline or a note on a display screen by directly inputting them on the display screen in addition to the original display function, and in that case, there is a further demand of performing a gray-scale representation in the display by the direct input.

SUMMARY

In consideration of the above circumstances, an advantage of the present invention is to provide a display device and an electronic paper capable of achieving low power consumption, corresponding to upsizing, moreover displaying an underline or a note on the display screen in response to a direct input on the display screen, and further performing a gray-scale representation on this occasion.

In view of the above technical problems, according to an aspect of the invention, there is provided a display device for active matrix drive including a plurality of pixels each having display retainability and including a first sub-pixel through an nth sub-pixel (n is a natural number greater than 1), a selection switching element provided correspondingly to each of the sub-pixels, connected to a data line, and for selecting the corresponding sub-pixel, and an external input switch provided correspondingly to each of the sub-pixels, connected to a selection line, and for supplying a signal from the selection line to the corresponding sub-pixel in response to an input operation from the outside. The selection line includes n kinds of selection lines, from a first selection line connected to the first sub-pixel to an nth selection line connected to the nth sub-pixel, and the n kinds of selection lines are connected to selection switches for one of selecting the selection lines individually and selecting two or more of the selection lines in a lump.

According to the display device, since the sub-pixels are each provided with an external input switch separately from the selection switching element, by selecting all of the selection switching elements and performing the direct input via the external input switch on the display screen on which the normal display is performed, it becomes possible to perform additional display such as an underline or a note to the normal display.

Further, since the selection lines (a first selection line through an nth selection line) are provided correspondingly to the sub-pixels, and the selection switches are connected correspondingly to the selection lines, by selecting the in kinds of selection lines, for example, (here m is a natural number satisfying 1≦m<n) by the selection switch, and thus selecting so that the external input is allowed to the m kinds of sub-pixels in the case in which the direct input is performed via the external input switch, the display with relatively small area, namely relatively light display with an area ratio of m/n can be performed. Therefore, contrasting density (gray-scale) of the display responsive to the direct input can be represented depending on selection of the sub-pixel pattern by the selection switching elements.

Further, since the period in which the external input switch is kept on can intuitively be adjusted when performing the direct input, by increasing the on-period, the amount of charge (accumulated amount) to the sub-pixel corresponding to the external input switch can be increased. Therefore, also by adjusting the on-period of the external input switch, representation of the display contrasting density (gray-scale) responsive to the direct input becomes possible.

Further, since there is no need for constantly detecting the coordinate position of each of the pixels, the processor can be eliminated, and further, since the pixels have retainability of the display, the display can be retained even in the standby state without requiring the power, thus achieving low power consumption.

Further, since the external input switch is provided corresponding to each of the pixels, and accordingly, the pixel is arranged to function independently from each other, even in the case in which the number of elements increases in conjunction with growth in size of the display screen, it can easily cope with the growth in size without such a difficulty as in the related art because of the fact that the processor can be eliminated as described above.

Further, in the display device described above, it is possible that the sub-pixels are configured to display colors different from each other.

By configuring as described above, when performing the direct input via the external input switch, by appropriately selecting the selection switches, the additional display such as an underline or a note to the normal display can be displayed with desired colors.

Further, in the display device described above, the external input switch is preferably a pressure-sensitive switching element, and in this case, the pressure-sensitive switching element is preferably a microelectromechanical switch.

Further, by using a pressure-sensitive switching element as the external input, switch, a pen not requiring power or the like and capable only of pressing can be used as the writing pen in the direct input.

Further, by using the microelectromechanical switch as the pressure-sensitive element, when manufacturing the active matrix circuit board with a known method, the pressure-sensitive switching element (the microelectromechanical switch) can be manufactured in an ordinary process without requiring a special process.

Further, in the display device described above, the selection switch is preferably a pressure-sensitive switching element.

By configuring as described above, by using a pressure-sensitive switching element as the selection switch, a pen not requiring power or the like and capable only of pressing can be used as the writing pen in the direct input.

Further, it is preferable that the display device have a microcapsule encapsulating an electrophoretic dispersion liquid held between a pair of substrates, and a protective film attached to an outer surface of a display side substrate out of the pair of substrates.

By configuring as described above, since the protective film is attached on the outer surface of the display side substrate to be an input surface for protecting the surface, it can be prevented that the microcapsule is broke by the pressing force caused by the direct input when the pressure-sensitive switching element is pressed in performing the direct input.

An electronic paper according to another aspect of the invention includes the display device described above.

According to the electronic paper, since additional display such as an underline or a note to the normal display can be displayed as described above, and further, the electronic paper is formed of the display device capable of achieving low power consumption, it can function not only as a common display device, but also as real paper.

BRIEF DESCRIPTION OF THE DRAWINGS

The invention will now be described with reference to the accompanying drawings, wherein like numbers refer to like elements.

DESCRIPTION OF THE EMBODIMENTS

Figure 1:
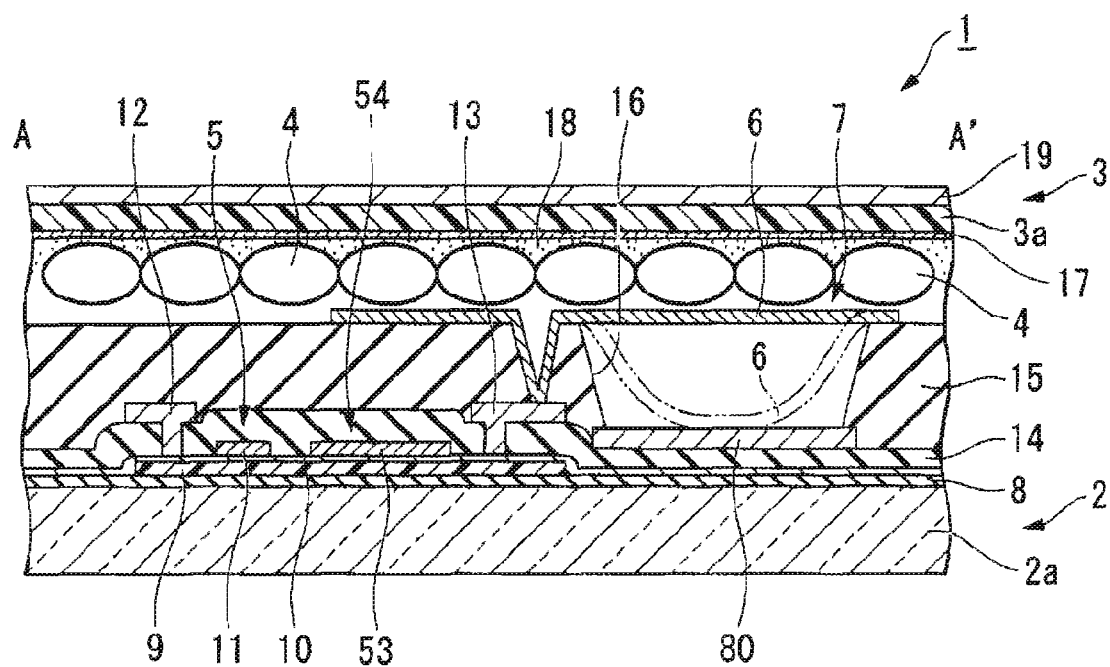
FIG. 1 is a cross-sectional view showing a substantial part of a schematic configuration of a display device according to a first embodiment of the invention.

Hereinafter, embodiments of the invention will be described with reference to the accompanying drawings. It should be noted that in the drawings referred to below, each of the composing elements is described with a scale appropriately modified for the sake of easy understanding.

Figure 2A:
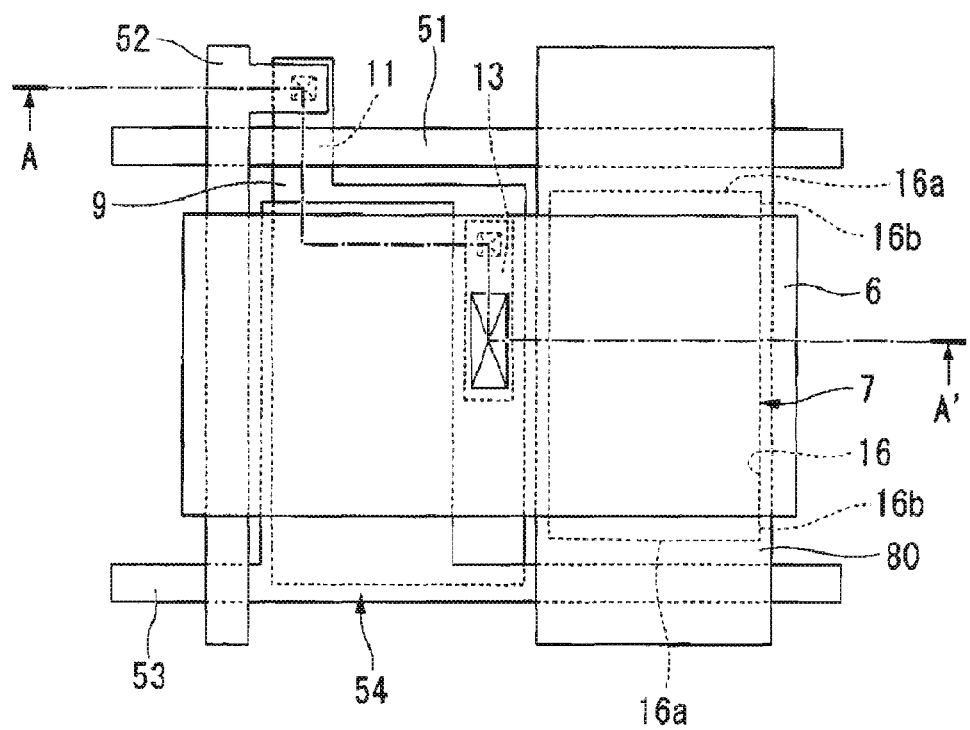
FIG. 2A is a plan view of a substantial part.
Figure 2B:
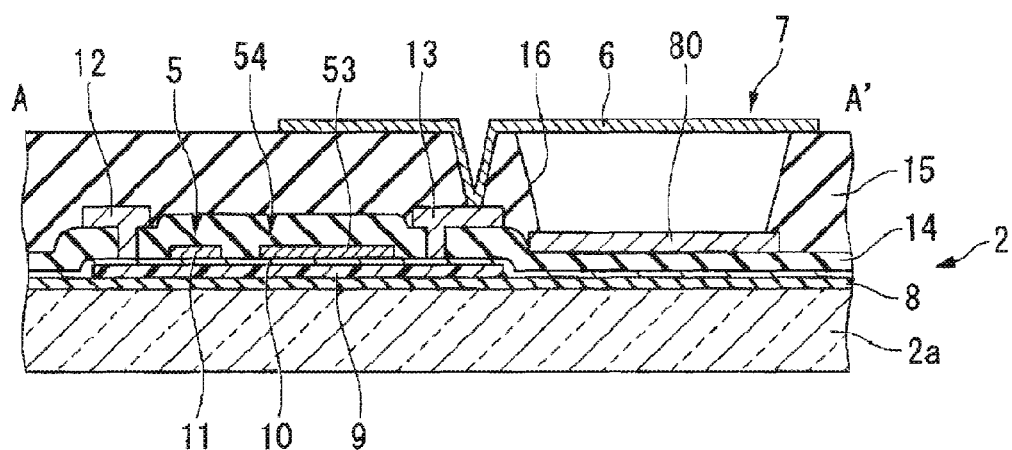
FIG. 2B is a cross-sectional view of the substantial part along the A-A' line in FIG. 2A.

FIG. 1 is a cross-sectional view showing a substantial part of the display device according to the first embodiment of the invention, wherein the reference numeral 1 denotes the display device. The display device 1 is configured having electrophoretic elements as display elements in the present embodiment, and has an element substrate 2 and a transparent substrate 3 holding microcapsules 4 encapsulating an electrophoretic dispersion liquid between these substrates 2 and 3. FIGS. 2A and 2B are diagrams showing a schematic configuration of an element substrate 2, wherein FIG. 2A, is a plan view of a substantial part of the element substrate 2, and FIG. 2B is a cross-sectional view of a substantial part thereof viewed along the A-A' line in FIG. 2A. It should be rioted that FIG. 1 is a cross-sectional view of a substantial part of the whole layers of the display device 1 at the position viewed along the A-A' line in FIG. 2.

Figure 3:
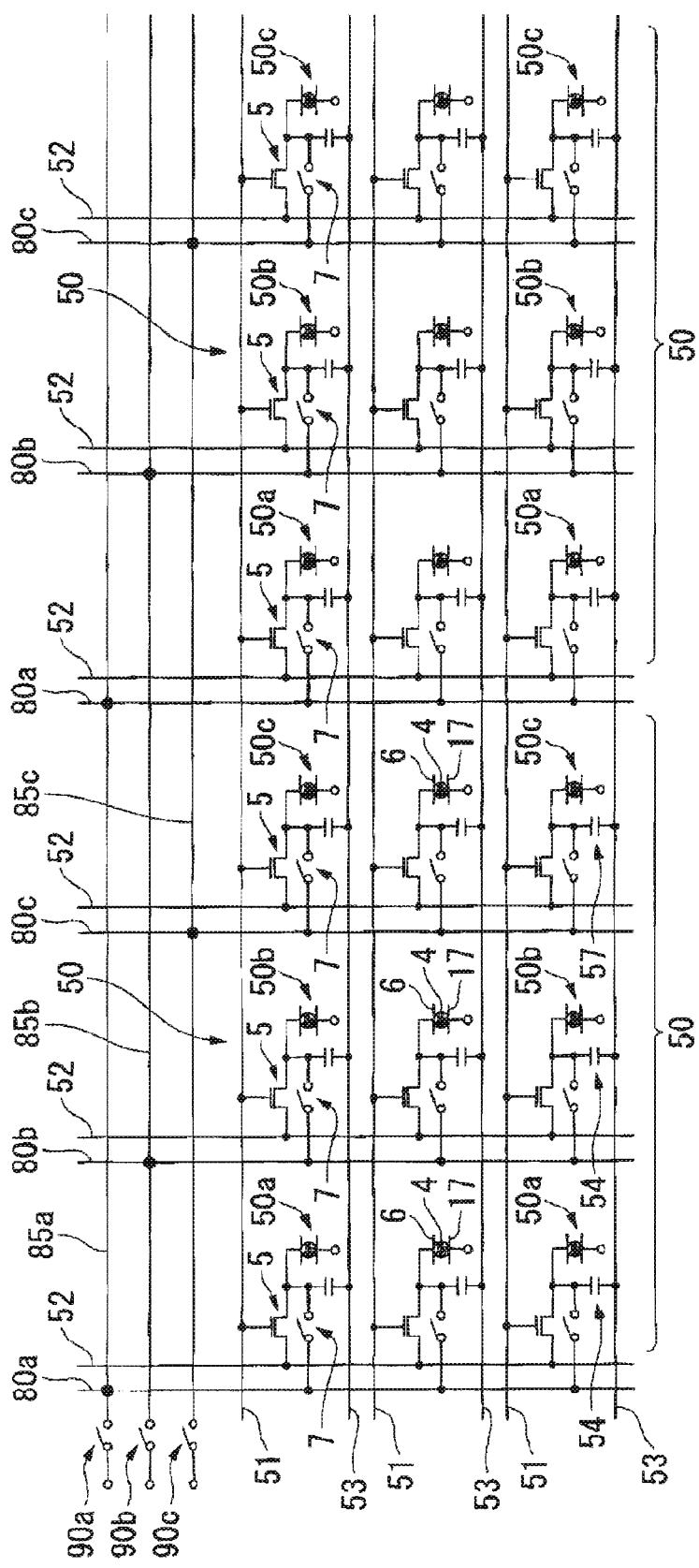
FIG. 3 is an equivalent circuit diagram of the display device shown in FIGS. 1, 2A, and 2B.

FIG. 3 is an equivalent circuit diagram of the display device 1, wherein the reference numeral 30 denotes a single pixel. The pixels 50 are arranged in a matrix, and are each composed of a first sub-pixel 50a, a second sub-pixel 50b, and a third sub-pixel 50c in the present embodiment. Each of the sub-pixels 50a, 50b, and 50c is provided with a selection switching element 5 for selecting respective one of the sub-pixels 50a, 50b, and 50c.

The selection switching element 5 is formed of a thin film transistor (TFT), and a scan line 51 is connected to the gate electrode thereof. The scan line 51 is arranged to provide a scan signal (a selection signal) from a control section (not shown) to each of the gate electrodes of a plurality of selection switching elements 5. Further, a data line 52 is connected to a source electrode of the selection switching element 5, and the data line 52 is arranged to provided a data signal from the control section (not shown) to each of the source electrodes of a plurality of selection switching elements 5.

On the side of a drain electrode (a pixel electrode 6) of the selection switching element 5, there is provided a capacitance element 54, and the capacitance element 54 is arranged to hold the state of electric polarization of the electrophoretic dispersion liquid in the microcapsule 4. It should be noted that the pixel 50 has the microcapsules 4 held between the pixel electrode 6 as the drain electrode of the selection switching element 5 and a common electrode 17 described later, Further, in the present embodiment, an external input switch 7 is provided in parallel to the selection switching element 5. In contrast to the selection switching element 5, the external input switch 7 is connected to a selection line 80a (80b, 80c) on one terminal thereof, and is connected to the pixel electrode 6 (the drain electrode) on the other terminal thereof to perform turning on/off of the connection between the selection line 80a and the pixel electrode 6. In other words, as described later, it is for supplying the stub-pixel 50a (50b, 50c) with a signal from the selection line 80a (80b, 80c) in response to an input operation with external pressure (pushing).

Here, the selection lines 80a, 80b, and 80c are provided correspondingly to the sub-pixels 50a, 50b, and 50c, respectively, wherein the selection line connected to the first sub-pixel 50a is a first selection line 80a, the selection line connected to the second sub-pixel 50b is a second selection line 80b, and the selection line connected to the third sub-pixel 50c is a third selection line 80c.

Further, selection switches 90a, 90b, and 90c are connected to these three types of selection lines 80a, 80b, and 80c via connection wirings 85a, 85b, and 85c, respectively. Each of the selection switches 90a, 90b, and 90c is configured as, for example, a mechanical switch, and is connected to the control section (not shown) via a wiring (not shown). According to such a configuration, each of the selection switches 90a, 90b, and 90c is arranged to supply the corresponding selection line 80 with a selection data signal from the control section (not shown) when turned on, and to stop supplying the selection line with the selection data signal when turned off.

In the present embodiment, the first selection switch 90a is provided to the first connection wiring 85a, and the first connection wiring 85a is connected to the first selection line 80a. Further, the second selection switch 90b is provided to the second connection wiring 85b, and the second connection wiring 85b is connected to the second selection line 80b. Still further, the third selection switch 90c is provided to the third connection wiring 85c, and the third connection wiring 85c is connected to the third selection line 80c.

According to such a configuration, it is arranged that only the external input switch 7 of the first sub-pixel 50a is selected by the first selection switch 90a, only the external input switch 7 of the second sub-pixel 50b is selected by the second selection switch 90b, and only the external input switch 7 of the third sub-pixel 50c is selected by the third selection switch 90c.

Therefore, by selecting either one of the selection switches 90a through 90c to be turned on, the gray-scale representation in the external input mode can be selected. In other words, the input is performed to one third of the whole pixel by turning on only one of them and turning off the rest, and the input is performed to two thirds of the whole pixel or to the whole pixel by turning on two of them or all of them, as a result, the gray-scale representation (grayscale display) by area-modulation can be realized. Further, by keeping all of the selection switches off, writing by the external input can be inhibited (disabled).

As shown in FIGS. 1, 2A, and 2B, the element substrate 2 has a number of selection switching elements 5 each formed of a thin film transistor (TFT) formed on a heat-resistant substrate (a substrate 2a) made of glass or quartz via a foundation insulating film 8, and further the pixel electrodes 6 formed on the respective selection switching elements 5, thus being configured as an active matrix substrate. The selection switching element 5 is configured having a semiconductor film 9 disposed on the foundation insulating film 8, a gate electrode 11 disposed on the semiconductor film 9 via a gate insulating film 10, a source electrode 12 connected to a source region (not shown) of the semiconductor film 9, and the pixel electrode (the drain electrode) 6 connected to the drain region (not shown) of the semiconductor film 9 via a relay electrode 13.

Here, the gate electrode 11 is connected to the scan line 51 as described above, and the source electrode 12 is connected to a data line 52. According to such a configuration, the selection switching element 5 is arranged to allow a signal flowing from the data line 52 to the source region to flow into the pixel electrode 6 via the relay electrode 13 on the drain side when the gate electrode 11 of the selection switching element 5 is selected by the scan line 51. It should be noted that a capacitance element 67 connected to the capacitance line 53 is formed in the drain region of the selection switching element 5.

Further, a first interlayer insulating film 14 is formed on the data electrode 11 and the capacitance line 53 so as to cover the data electrode 11 and the capacitance line 53, and the source electrode 12 is extracted on the first interlayer insulating film 14 through a contact hole (not shown) provided to the first interlayer insulating film 14, and is formed there. Similarly to the source electrode 12, the relay electrode 13 is also extracted electrically on the first interlayer insulating film 14 through a contact hole (not shown), and is formed on the interlayer insulating film 14.

Further, on the first interlayer insulating film 14, there is formed a second interlayer insulating film 15, and on the second interlayer insulating film 15, there is formed a pixel electrode 6 electrically extracted through a contact hole (not shown), and accordingly in the condition of being connected electrically to the relay electrode 13.

Further, in the element substrate 2, an external input switch 7 is provided in parallel to the selection switching element 5 as described above. The external input switch 7 is a pressure-sensitive mechanical switch composed of a part of the election line 80 (the first selection line 80a, the second selection line 80b, or the third selection line 80c), a hollow section 16 provided to the second interlayer insulating film 15 so as to expose a part of the selection line 80 on the bottom thereof, and a part of the pixel electrode 6.

Specifically, in the external input switch 7, in response to the transparent substrate 3 side as the display surface side being pressed (pressurized) by a stylus or the like, the pixel electrode 6 located above the hollow section 16 is concaved as illustrated with the chain double-dashed lines in FIG. 1 to have contact with the part of the selection line 80 exposed inside the hollow section 16. Then, the electrical connection therebetween is established, and the selection data signal from the selection line 80 is supplied to the pixel electrode 6 by the selection line 80 being electrically connected to the pixel electrode 6, thus the signal from the selection line 80 becomes to be supplied to the respective one of the sub-pixels 50a, 50b, and 50c. It should be noted that although the relationship between the width and the depth of the hollow section 16 in FIG. 1 is illustrated to have an extremely large depth in comparison with the actual size for the sake of easy understanding, in reality, it is formed to have a shallow depth so that slight distortion in the pixel electrode 6 causes contact between the distorted pixel electrode 6 and the part of the selection line 80.

Here, as shown in FIG. 2A, the hollow section 16 has a rectangular opening shape, and a substantial part thereof is formed right under the pixel electrode 6 in the plan view, but a part thereof is arranged to open outside the pixel electrode due to a process as described later. Further, the external input switch 7 uses the part of the pixel electrode 6 located right above the hollow section 16 as the pressure-sensitive section functioning as the input section as described above. Although varying in accordance with the size of the sub-pixel 50*a* (50*b*, 50*c*), the pressure-sensitive section is formed to have an area size of, for example, 30 through 70 percent of the area of the sub-pixel 50*a* (50*b*, 50*c*). This is because the proportion less than 30 percent is too low for the area of the pressure-sensitive section (the external input switch 7) accounting in the sub-pixel 50*a* (50*b*, 50*c*) to provide high enough sensitivity for the pressure. Further, the fact that the proportion exceeding 70 percent, which requires larger area of the data line 52 accordingly, narrows the area for forming other elements to tighten the manufacturing condition is also the reason therefor.

As shown in FIG. 1, the transparent substrate 3 has a transparent common electrode 17 made of ITO or the like formed inside a film-shaped flexible transparent substrate 3*a* made of transparent resin or the like, and defining the outer face side as a display face (observing face) side. Here, as the transparent substrate 3*a*, polyethylene terephthalate (PET), polyethersulfone (PES), polycarbonnate (PC), for example, can preferably be used.

It should be noted that it is not limited to the flexible substrate, but can have a configuration using inorganic glass formed as a thin film or rigid resin.

Between the element substrate 2 and the transparent substrate 3 formed of such configurations, there are disposed the microcapsules 4 in particular on the pixel electrode 6, thus the microcapsules 4 form the display area of the display device 1. The microcapsules 4 each encapsulate the electrophoretic dispersion liquid as a display material as described above, and are all formed to have the same diameter, for example, of about 30 μm. It should be noted that in the present embodiment, as shown in FIG. 1, the microcapsules 4 are held between the element substrate 2 and the transparent substrate 3 in a pre-pressurized condition, thus each of the microcapsules 4 has a flat shape with an ellipsoidal side view instead of a spherical shape.

The electrophoretic dispersion liquid is composed of electrophoretic particles and a liquid-phase dispersion medium for dispersing the electrophoretic particles. As the liquid-phase dispersion medium, water, an alcohols solvent such as methanol, ethanol, isopropanol, butanol, octanol, or methyl cellosolve, various esters such as ethyl acetate or butyl acetate, ketones such as acetone, methyl ethyl ketone, or methyl isobutyl ketone, aliphatic hydrocarbons such as pentane, hexane, or octane, alicyclic hydrocarbons such as cyclohexane or methyl cyclohexane, aromatic hydro carbons such as benzenes having a long-chain alkyl group such as benzene, toluene, xylene, hexylbenzene, butylbenzene, octylbenzerne, nonylbenzene, decylbernzene, undecylbenzene, dodecylbenzene, tridecylbenzene, or tetradecylbenzene, halogenated hydrocarbons such as methylene chloride, chloroform, carbon tetrachloride, or 1, 2-dichloroethane, carboxylate salt, or other various oils can be used alone or in combination combined with a surface active agent or the like.

Further, the electrophoretic particles are organic or inorganic particles (polymer or colloid) having a property of moving by the electrophoretic migration by the potential difference in the liquid-phase dispersion medium.

As the electrophoretic particles, one or more of a black pigment such as aniline black, carbon black, or titanium black, a white pigment such as titanium dioxide, zinc oxide, antimony trioxide, an azo pigment such as monoazo, Isazone, or polyazo, a yellow pigment such as isoindolinone, chrome yellow, yellow iron oxide, cadmium yellow, titanium yellow, antimony, a red pigment such as quinacridone red or chrome vermilion, a blue pigment such as phthalocyanine blue, indanthrene blue, anthraquinone pigment, iron blue, ultramarine blue, or cobalt blue, and a green pigment such as phthalocyanine green can be used.

Further, a charge control agent composed of particles of electrolyte, surface active agent, metal soap, resin, rubber, oil, varnish, compound, and so on, dispersion agent such as a titanate coupling agent, an aluminate coupling agent, or a silane coupling agent, a lubricant agent, a stabilization agent and so on can be added to these pigments.

As a material for forming the wall membrane of the microcapsule 4, a gum arable and gelatin composite film, a compound such as polyurethane resin or urea resin can be used.

It should be noted that in the display device 1 according to the first embodiment, two kinds of electrophoretic particles are encapsulated in each of the microcapsules 4, wherein one is charged negatively and the other is charged positively. As the two kinds of electrophoretic particles, there are used, for example, titanium dioxide as a white pigment and carbon black as a black pigment. Further, by using such two kinds of white and black electrophoretic particles, it is possible to display characters with the black electrophoretic particles and the background thereof with the white electrophoretic particles, for example, in the case of displaying the characters.

Further, it is also possible to perform display by using only one kind of electrophoretic particles and electrophoresing them to side of the common electrode 17 or the side of the pixel electrode 6.

Further, these microcapsules 4 are fixed to, for example, the transparent substrate 3 above the common electrode 17 with a binder 18. As the binder 18, a material having a good affinity with the wall membrane of the microcapsule 4, superior adhesion to the common electrode 17, and an insulating property can be used. For example, polyethylene, chlorinated polyethylene, ethylene-vinyl acetate copolymer, silicone resin can be used therefor.

Further, these microcapsules 4 are fixed to the element substrate 2 with, for example, a double-sided adhesive sheet (not shown) above the pixel electrode 6. The double-sided adhesive sheet is formed of a rubber material or an acrylic material with adhesiveness having a thickness of about 25 μm, for example, and is fixed on the pixel electrodes 6 of the element substrate 2 and also fixed to the microcapsules 4, thus fixedly holding the microcapsules 4 on the element substrate 2. It should be noted that it is also possible to bond them also to the side of the element substrate 2 using the binder 18 described above instead of using such a double-sided adhesive sheet.

The microcapsules 4 are held between the element substrate 2 and the transparent substrate 3 with the above configuration, thus forming the display device 1.

Further, in the present embodiment, a transparent protective film 19 is adhered particularly to the outer surface of the transparent substrate 3. As the protective film 19, various kinds of transparent films can be used, and the same material as that of the transparent substrate 3*a*, namely polyethylene terephthalate (PET), polyethersulfone (PES), polycarbonate (PC), and so on can also be used.

The protective film 19 is for preventing the microcapsules 4 from being broken by the pressure against the transparent substrate 3 when the side of the transparent substrate 3 is pressed for a direct input to turn on the external input switch 7 described above by applying the pressure. In other words, when the side of the transparent substrate 3 is pressed to turn on the external input switch 7, the pressing force also acts on the microcapsules 4. It is necessary that it is designed so that the allowable curvature radius r1 of the side of the transparent substrate 3 does not underrun the allowable curvature radius r2 of the microcapsules 4, namely r1≧r2 is satisfied on this occasion. Further, in the case in which this condition is not satisfied by the transparent substrate 3 alone, the protective film 19 is attached to the transparent substrate 3 to reinforce the transparent substrate 3, thus preventing breakage of the microcapsules 4 by the excess pressure.

For example, assuming that the minimum width of the hollow section 17 of the external input switch 7 is W, the maximum depth of the hollow section 17 of the external input switch 7 is h, and the allowable minimum curvature radius of the microcapsules 4 is r (=r2), the depth h of the hollow section 16 is designed (based on the Maclaurin expansion up to the first order thereof so as to satisfy the following formula.

$$h < W^2/8r$$

Specifically, in the case in which the minimum width W of the hollow section 16 is 200 μm, and the allowable (endurable) curvature radius r (=r2) of the microcapsules 4 is 1 cm, $W^2/8r=500$ nm is obtained, and consequently, it should be sufficient to design the depth of the hollow section 16 to be 450 nm, for example, with a margin.

Further, it is sufficient that the protective film 19 is attached thereto for performing reinforcement so that the curvature radius r1 of the entire substrate obtained by combining the transparent substrate 3 with the protective film 19 exceeds the r2, so that the curvature radius r1 of the side of the transparent substrate 3 does not underrun the endurable curvature radius r (=r2) of the microcapsules 4 under such circumstances.

Further, the display device 1 is provided with the control section (not shown) for supplying the scan lines 51, the data lines 52, and the selection lines 80 (the first selection line 80a, the second selection line 80b, and the third selection line 80c) with respective signals, and display is arranged to be performed by the control section provided with display data input thereto or based on the display data previously stored in a memory (not shown). In other words, it is arranged to have an ordinary display function provided to a general display device.

Then, a manufacturing method of the display device 1 formed of such a configuration will be explained.

Figure 4A:
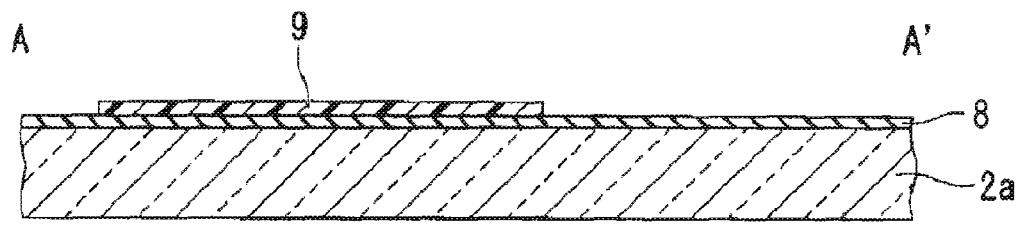
FIGS. 4A through 4C are explanatory diagrams of a manufacturing process of the display device shown in FIG. 1.

Firstly, as shown in FIG. 4A, a substrate 2a (e.g., a glass substrate, a quartz substrate) endurable with the heat in the laser annealing process described later is provided, and the foundation insulating film 8 made of $SiO_2$ or the like is formed on the surface (inner surface) thereof. Subsequently, the semiconductor film 9 made of polysilicon is formed on the foundation insulating film 8. As the method of forming the semiconductor film 9, there is cited a method of depositing amorphous silicon by, for example, a CVD method, polycrystallizing it by a laser annealing method to form polysilicon, then patterning it as a desired shape using a known lithography technology and an etching technology, thereby obtaining the semiconductor film 9 with a desired shape.

Figure 4B:
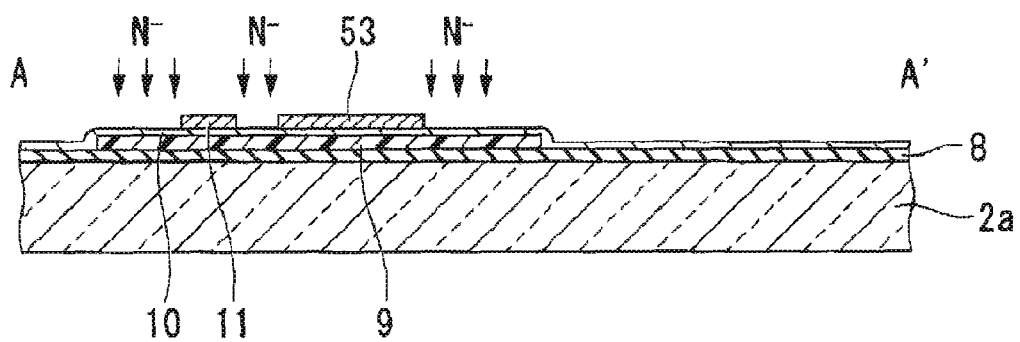

Then, as shown in FIG. 4B, the gate insulating layer 10 is formed so as to cover the semiconductor film 9, and further a conductive film (not shown) made of A1 or the like is formed further thereon. Further, by patterning the conductive film using the known lithography technology and the etching technology, the scan line 51 including the gate electrode 11 and the capacitance line 53. Subsequently, using the gate electrodes 11 (the scan lines 51) as a mask. N-type impurities, for example, are ion-implanted to the semiconductor film 9, thus forming the source region (not shown) and the drain region (not shown).

Figure 4C:
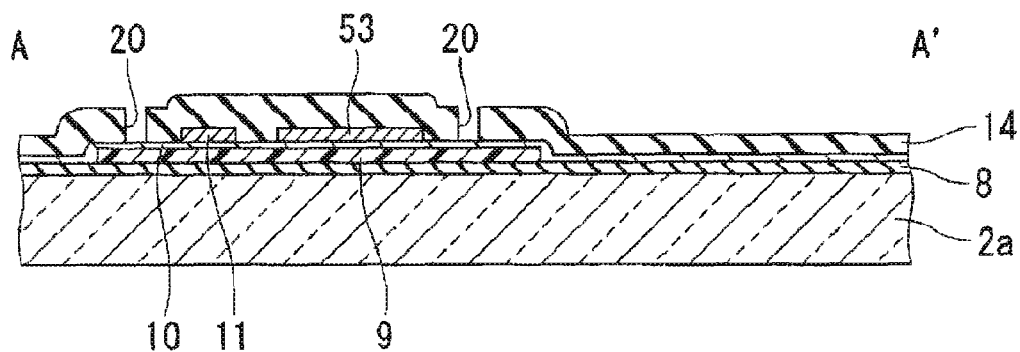

Subsequently, as shown in FIG. 4C, the first interlayer insulating film 14 made of $SiO_2$ or the like is formed so as to cover the semiconductor film 9, the scan line 51 (the gate electrode 111) and the capacitance line 53. Subsequently, contact holes 20 communicating respectively to the source region and the drain region are formed.

Figure 5A:
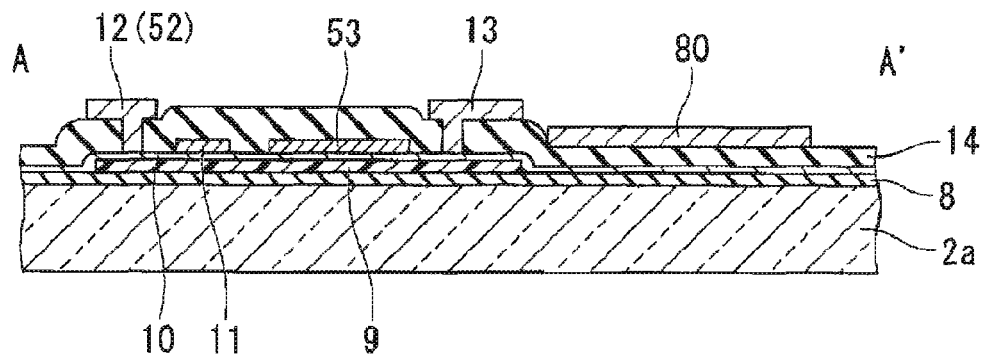
FIGS. 5A through 5C are explanatory diagrams of a manufacturing process of the display device shown in FIG. 1.

Subsequently, by forming the conductive film (not shown) made of A1 or the like so as to fill in the contact holes 20, and further patterning the conductive film, the data line 52 including the source electrode 12, the relay electrode 13, and the selection line 80 (the first selection line 80a, the second selection line 81b, or the third selection line 80c) are formed as shown in FIG. 5A.

Figure 5B:
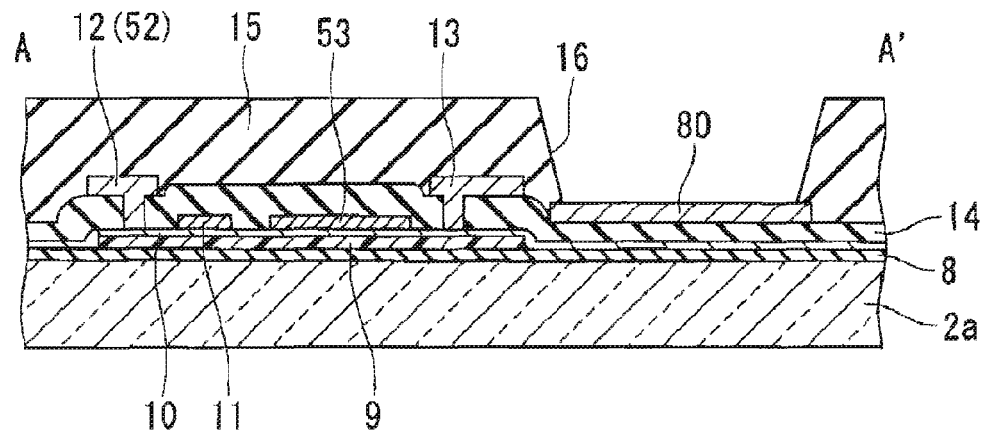

Subsequently, the second interlayer insulating film 15 made of $SiO_2$, SiN, or the like is formed by a CVD method or the like so as to cover the source electrode 12 and the relay electrode 13. Subsequently, the second interlayer insulating film 15 is patterned using the known lithography technology and the etching technology to form the hollow section 16 right above the selection line 80 as shown in FIG. 5B. Thus, the selection line 80 is exposed on the bottom of the hollow section 16.

Figure 5C:
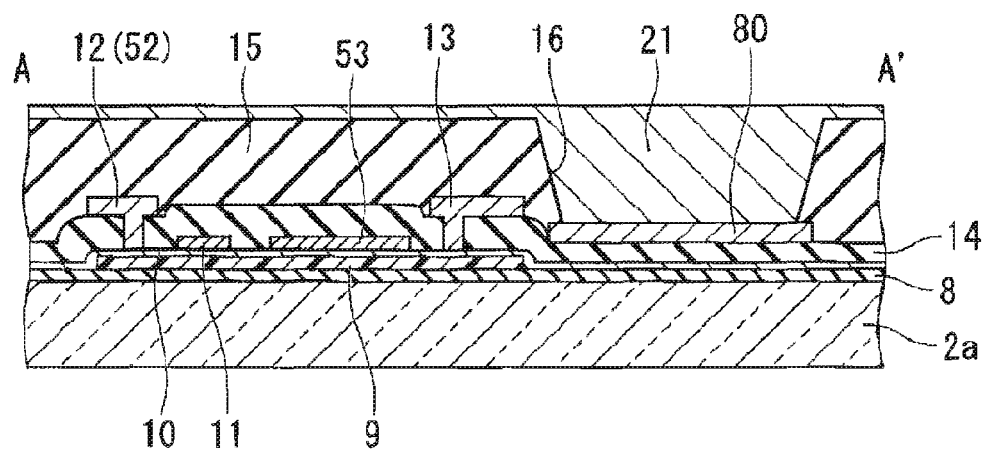

Subsequently, a material providing a selection ratio with the second interlayer insulating film 15 and the pixel electrode 6 formed in the later process is deposited by a CVD method or the like as a film to fill in the hollow section 16 with the material as shown in FIG. 5C. Specifically, amorphous silicon is deposited by the CVD method to form a sacrifice layer 21 in a condition in which the hollow section 16 is filled with the sacrifice layer 21.

Figure 6A:
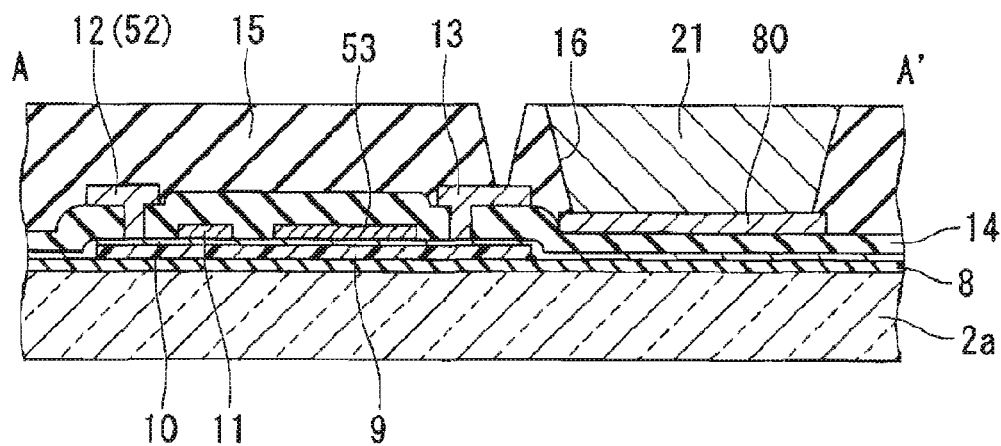
FIGS. 6A through 6C are explanatory diagrams of a manufacturing process of the display device shown in FIG. 1.

Subsequently, the sacrifice layer 21 on the second interlayer insulating film 15 is removed by a chemical mechanical polishing (CMP) method or the like and the sacrifice layer 21 is kept only inside the hollow section 16. After then, the second interlayer insulating film 15 is patterned to form the contact hole 22 communicating to the relay electrode 13 as shown in FIG. 6A.

It should be noted that regarding the formation of the sacrifice layer 21, liquid-phase method such as an inkjet method (droplet discharge method) can also be adopted instead of the vapor-phase method such as the CVD described above. In particular, by adopting the inkjet method, since the material in the sacrifice layer can selectively be delivered, it becomes possible to form the sacrifice layer 21 only inside the hollow section 16, thus the process of the CMP method or the like can be eliminated. This is because, since the hollow section 16 functions so as to receive and keep the material for forming the sacrifice layer in the hollow section 16 from flowing out of the hollow section 16, it can easily be prevented that the sacrifice layer is formed on the second interlayer insulating film 15.

Figure 6B:
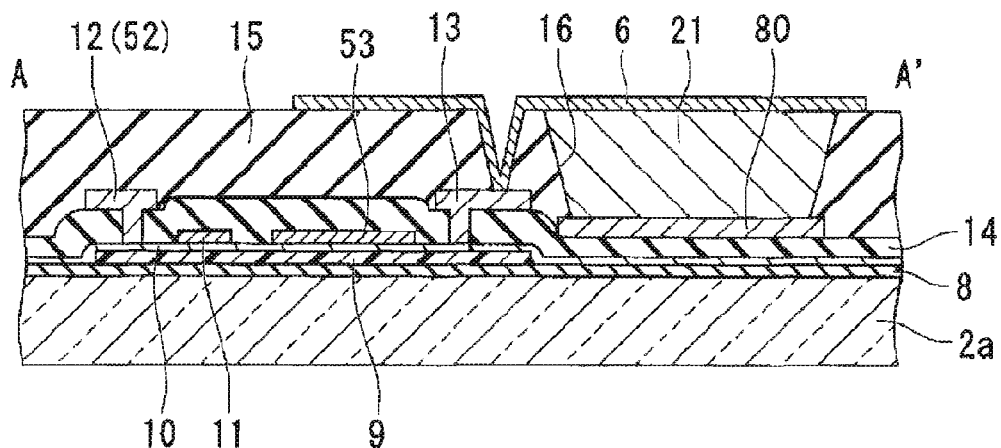

Subsequently, by forming the conductive film (not shown) made of A1 or the like in the condition of filling the contact hole 22, and further patterning the conductive film, the pixel electrode 6 is formed as shown in FIG. 6B. The thickness of the pixel electrode 6 is arranged to be in a range of, for example, about 200 through 300 nm. By adopting such a thickness, both of sufficient flexibility and rigidity can be obtained. In other words, as described later, in the external input switch 7, when the side of the transparent substrate 3 is pressed (pressurized) to be deformed elastically, the pixel electrode 6 is also distorted easily inside the hollow section 16 to have contact with the data line 52. Further, in response to the side of the transparent substrate 3 elastically restoring due to removal of the pressing force, it becomes easily separated from the data line 52. Further, by adopting the thickness described above, for example, it becomes possible that the operations of the elastic deformation and the elastic restoration of the pixel electrode 6 are repeated a number of times (e.g., several tens of thousands through several hundreds of thousands of times) without trouble.

It should be noted that the pixel electrode 6 is formed as shown in FIG. 2A so that the inside of the hollow section 16, namely the sacrifice layer 21 inside the hollow section 16 is exposed outside. Specifically, both sides of the hollow section 16, which are the short sides 16a of the rectangular opening section of the hollow section 16., are exposed outside. Regarding the sizes, it is arranged that long side (the short side 16a of the opening section of the hollow section 16) of an elongated rectangle exposed each side, for example, is about 200 μm and short side 16b of the elongated rectangle is about 3 μm.

Figure 6C:
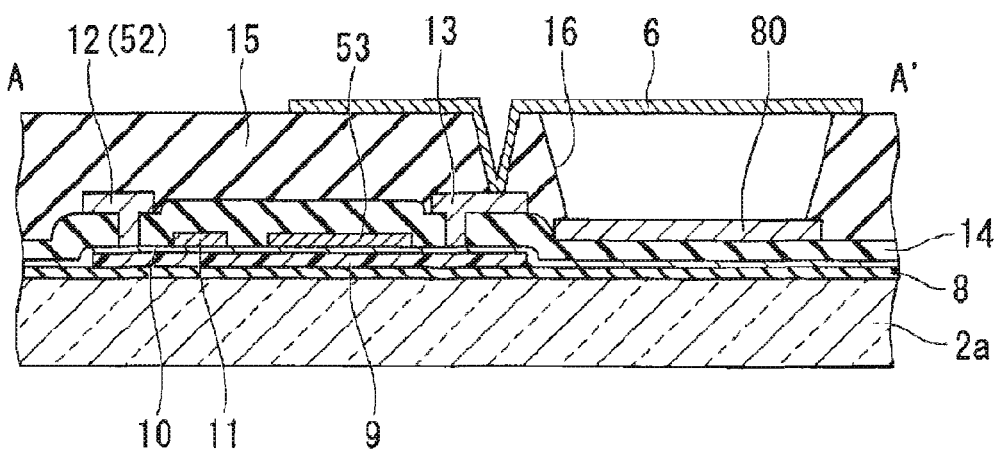

Subsequently, the sacrifice layer 21 inside the hollow section 16 is etched to be removed as shown in FIG. 6C. As the etching process, a dry etching process using $XeF_2$ as an etching gas is preferably adopted. It should be noted that a dry etching process using other etchant or a wet etching process can also be adopted.

It should be noted that in order for reducing the time required for removing the sacrifice layer 21 by etching as described above, for the purpose of enlarging the area of the sacrifice layer 21 inside the hollow section 16 exposed outside, a number of small through holes (not shown) can be provided to the pixel electrode 6 located above the hollow section 16. By thus providing such through holes, even the sacrifice layer 21 in the center area of the hollow section 16, for example, can be removed by etching from the beginning, thus the time required for removing the sacrifice layer 21 can be reduced.

Through the process described above, the element substrate 2 can be obtained. Further, the external input switch 7, in particular, becomes a switch formed of a so-called microelectromechanical system (MEMS), namely a microelectromechanical switch.

Further, although not shown in FIGS. 1, 2A, 2B, and 4A through 6C, in the present embodiment, the selection switches 90a through 90c shown in FIG. 3 are each formed as a thin film transistor (TFT) formed of the same configuration as that of the selection switching element 5 by the same process as that of the selection switching element 5. Further, it is also possible that a wiring is lead to the outside to provide a contact switch (e.g., a toggle switch or a push-button switch as an ordinary electric component), or it is formed as a pressure-sensitive switching element (a microelectromechanical switch) formed of the same configuration as that of the external input switch 7 by the same process as that of the external input switch 7.

Further, separately from such an element substrate 2, the transparent substrate 3 having the common electrode 17 formed on the inside surface of the transparent substrate 3a is provided. Subsequently, the microcapsules 4 are evenly fixed on the inside surface of the common electrode 17 using the binder 18, and the protective film 19 is attached to the outer surface of the transparent substrate 3.

Further, by fixedly bonding the side of the transparent substrate 3 thus formed as described above to the element substrate 2 on the side of the pixel electrode 6 via a double-sided adhesive sheet (not shown) the display device 1 shown in FIG. 1 can be obtained.

hereinafter, a display method of the display device 1 will be explained going back to FIG. 1.

The display device 1 is arranged to collect the electrophoretic particles in the microcapsules 4 to a desired side of the electrode by changing the direction of the voltage (electric field) applied between the pixel electrode 6 and the common electrode 17, thus a desired display can be performed.

Specifically, the two kinds of white and black particles, for example, are used as the electrophoretic particles as described above, one kind thereof, the white particles, for example, are charged negatively, and the other kind thereof, the black particles, are charged positively. Then, when performing display, by inputting a signal to the desired pixel electrodes 6, an electric field is applied (a voltage is applied) so that the side of the transparent substrate 3 (the side of the common electrode 17) to be the display surface becomes relatively negative with respect to the side of the pixel electrode 6. Then, the black particles are electrophoresed to the side of the transparent substrate 3 while the white particles are electrophoresed to the side of the element substrate 2. Therefore, a part for forming a substantial display such as a character, for example, is displayed on the side of the transparent substrate 3 with the black particles, and a part to be the background thereof is displayed on the side of the transparent substrate 3, thus a desired display can be performed.

Further, the electrophoretic element having an electrophoretic dispersion liquid including such electrophoretic particles has retainability of display. Specifically, once a desired display is performed, the electrophoretic particles are held as they are even when the power is turned off thereafter to set the voltage applied between the pixel electrode 6 and the common electrode 17 to zero, and consequently, the display condition when the power is supplied thereto is retained as it is. Further, by applying the reverse voltage between the pixel electrode 6 and the common electrode 17, the retained display can be canceled. Therefore, by turning the power on again, for example, and newly inputting the display data, it is possible to cancel the retained display and to perform the new display.

It should be noted that in the display device 1, a battery, for example, can be provided as the power supply, or can also be configured so that the power is supplied from an external power supply via a dedicated adapter. It is obvious that a switching section for switching the power supply can also be provided.

In the case in which the display is performed by the display device 1 with, for example, a normal display function, the control section outputs electric signals to the scan lines 51 and the data lines 52, and adjusts the display (black display or white display) of each of the pixels 50 via the selection switching elements 5, thus performing the desired display on the side of the transparent substrate 3 to be the display surface.

Further, in the case in which the desired display is performed and an underline or a note needs to be added to the display content, writing is performed on the side of the transparent substrate 3 in the display device 1, on the protective film 19 in the present embodiment, with a suitable writing pen. It should be noted that the writing pen does not require the power or the like, there is no need for using a dedicated writing pen having a special function with a magnetic effect or the like, and anything can be used as the writing pen providing it has a pen tip with an appropriate thickness (width) and does not damage the protective film 19. Further, if there is nothing appropriate, a fingertip can be used for writing.

Further, in the case in which a contrasting density of the line to be written, namely the gray-scale thereof particularly needs to be set when thus writing with the pen or the like, by turning on either one or more of the selection switches 90a through 90c described above, the setting of the gray-scale becomes possible.

When the first selection switch 90a, for example, is selected, the control section (not shown) becomes to be connected only to the first selection line 80a via the first selection switch 90a as shown in FIG. 3. Therefore, the external input switches 7 of the respective sub-pixels 50a through 50c becomes in a condition in which the external input is allowed only to the first sub-pixel 50a out of the sub-pixels 50a through 50c. Therefore, even when the pixel 50 is pressed by a writing operation, and the external input switches of the respective sub-pixels 50a, 50b, and 50c are turned on accordingly, the control section only supplies the first selection line 80a with the selection data signal, and as a result, only the display with relatively small area only by the sub-pixel 50a, namely the display with low intensity corresponding to only one third in the area modulation is performed.

Further, in the case of selecting, for example, the second and third selection switches 90b, 90c, the control section (not shown) becomes to be connected to both of the second and third selection lines 80b, 80c via the second and third selection switches 90b, 90. Therefore, the external input switches 7 of the respective sub-pixels 50b, 50c become in a condition of allowing the external output. Therefore, even when the pixel 50 is pressed by a writing operation, and the external input switches of the respective sub-pixels 50a, 50b, and 50c are turned on accordingly, the control section only supplies the second and third selection lines 80b, 80c with the selection data signal, and the display with relatively high intensity corresponding to two thirds in the area modulation by the sub-pixels 50b, 50c is performed.

Therefore, by appropriately selecting any of the first through third selection switches 90a through 90c to perform switching of the selection switches 90, the gray-scale (contrasting density) can be represented with respect to the display responsive to the direct input.

It should be noted that in the normal condition (initial condition), the second selection switch 90b, for example, is selected, and it is arranged that writing (external input) can be performed in the present condition without switching the selection switches 90 in the case in which there is no particular need for setting the gray-scale.

Further, when performing writing with a pen or the like after thus performing the gray-scale setting according to need, the display device 1 electrophoreses the black particles, for example, to the side of the transparent substrate 3 while electrophoresing the white particles to the side of the element substrate 2 only in the selected ones of the sub-pixels 50a through 50c in the pixels 50 on which the pressing (pressurizing) by writing is executed, thus the black display is performed.

Specifically, in the sub-pixels 50a through 50c on which pressing by writing is executed, the pixel electrodes 6 above the hollow sections 16 forming the external input switches 7 receive the pressing force, and are distorted inside the hollow sections 16 to have contact with the respective selection lines 80a through 80c, thus establishing the electrical connection. Consequently, since the selection data signals from the control section are supplied to the pixel electrodes 6 via the selection lines 80a through 80c, the sub-pixels 50 become to perform the black display.

It should be noted that in the case in which the sub-pixels 50a through 50c are arranged to originally perform the black display, the display does not change in response to the operation of the external input switches 7, and in the case in which the sub-pixels 50a through 50c are arranged to originally perform the white display, the display changes to the black display in response to the operation of the external input switches 7.

Therefore, in consideration of the whole display surface composed of a number of pixels, by writing an underline and so on with a pen or the like in a blank space of an area in which the characters are displayed, namely an area where the white display is performed, the area where writing is performed can be changed from the white display to the black display. Consequently, the area where direct writing is newly performed can additionally be displayed in addition to the originally displayed content. It should be noted that since each of the pixels 50 (each of the sub-pixels 50a through 50c) in the area where writing is newly performed also has retainability of the display, the display is retained as it is without disappearing even after the writing is terminated.

Further, it is possible to represent the contrasting density (gray-scale) of the display responsive to the writing (direct input) in accordance with a variation in the period in which the external input switch 7 is kept on when performing writing. In other words, when performing writing, by drawing a line at a low speed, for example, to make each of the external input switches 7 perform the on-operation in a long period of time, the amount of charge (accumulated amount) in the pixel electrode 6 corresponding to the external input switch can be increased. According to the above operation, by electrophoresing relatively large number of black particles to the transparent substrate 3, and substantially the same number of white particles to the side of the pixel electrode 6, relatively deep (black) color can be displayed.

Further, when drawing a line at a high speed, and making each of the external input switches 7 perform the on-operation in a short period of time, the amount of charge (accumulated amount) in the pixel corresponding to the external input switch 7 can be reduced. In this case, by electrophoresing relatively small number of black particles to the transparent substrate 3, and substantially the same number of white particles to the side of the pixel electrode 6, relatively light color (gray) can be displayed.

Further, it is also possible to provide the display device 1 with a partial erase button for reversing the application voltage so that the white particles are electrophoresed to the transparent substrate 3 while the black particles are electrophoresed to the side of the pixel electrode 6 in response to the external input switch 7 being turned on. According to this configuration, by tracing a desired portion of the display with the pen while the display is performed, it is possible to erase the portion like an "eraser." It should be noted that on this occasion, by using a pen with a rather thick tip, the portion of the partial erase can be widened.

Further, in the case in which it is required to newly write a content by the direct input on a clean sheet instead of adding something to the displayed content while performing the desired display, when pressing, for example, an all clear button provided to the display device 1, the control section outputs electrical signals to the scan lines 51 and the data lines 52 using an ordinary function to set all of the display screen of the pixels 50 to be the white display via the selection switching elements 5. Further, it is possible to configure that a desired display can be performed by performing writing as described above in that condition. It should be noted that the all clear button can also be formed of the contact switch or the pressure-sensitive microelectromechanical switch as is the case with the external input switch 7.

In such a display device 1, since the external input switch 7 is provided separately from the selection switching element 5, by performing the direct input (writing) via the external input switch 7 on the display screen on which a normal display is performed by the selection switching element 5, additional content such as an underline or a note can be displayed to the normal display.

Further, since the selection lines (the first selection line 80a through the third selection line 50c) are provided respectively to the sub-pixels 50a through 50c, and the first through third selection switches 90a through 90c are connected respectively to the selection lines 80, by switching the selection switches 90, the gray-scale (contrasting density) can be represented with respect to the display responsive to the direct input.

Further, since it is not required to constantly detecting the coordinate position of each of the pixels 50 (each of the sub-pixels 50a through 50c), the processor can be eliminated, and further, since the pixels 50 have retainability of the display, the display can be retained even in the standby state without power. Therefore, low power consumption can be achieved.

Further, since the external input switch 7 is provided corresponding to each of the pixels 50, and accordingly, is arranged to function independently from each other, even in the case in which the number of elements increases in conjunction with growth in size of the display screen, it can easily cope with the growth in size without such a difficulty as in the related art because of the fact that the processor can be eliminated as described above.

Further, since the external input switch 7 is formed of a pressure-sensitive switching element, a pen not requiring power or the like and capable only of pressing can be used as the writing pen in the direct input.

It should be noted that although in the above embodiment, by electrophoresing the black particles to the transparent substrate 3 and the white particles to the side of the pixel electrode 6 in response to the external input, the black display is performed on the present pixel, thus performing the substantial display of the underline and so on, it becomes also possible that a switch (not shown) for reversing the polarity of the applied voltage is provided, which has previously been turned on, thus the portion on which the black display has already performed and partially be changed to the white display in response to the external input, thereby performing the partial erase.

Then, a display device according to a second embodiment of the invention will hereinafter be explained.

Figure 7:
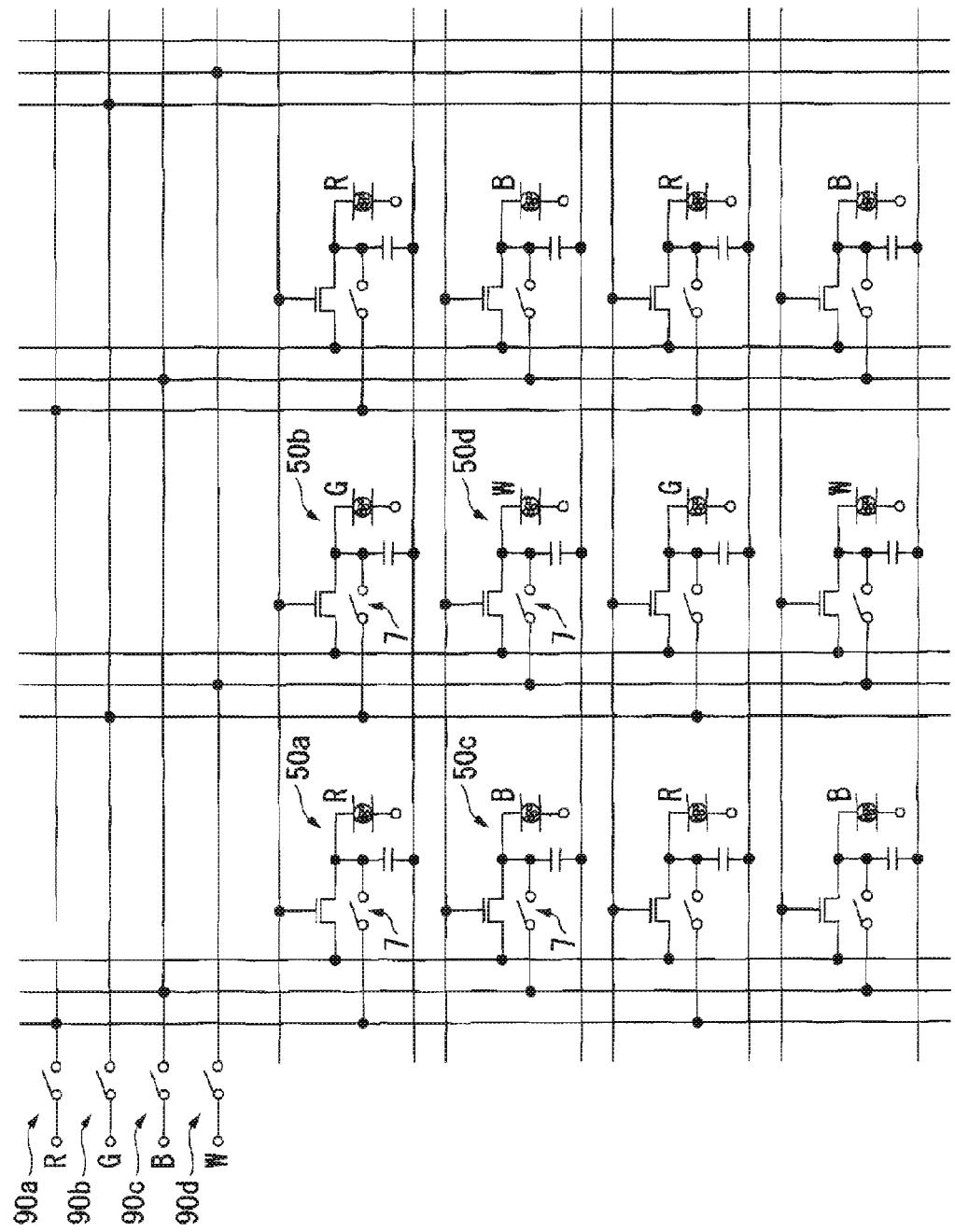
FIG. 7 is an equivalent circuit diagram of a display device according to a second embodiment of the invention.

The display device according to the second embodiment is different from the display device 1 of the first embodiment in that the transparent substrate 3 is provided with a red color filter (not shown), a green color filter (not shown), and a blue color filter (not shown), and is configured to perform color display, and that each pixel (not shown) is composed of four sub-pixels 50a through 50d as shown in FIG. 7.

In other words, in the present embodiment, the color filters are disposed correspondingly to the sub-pixels 50a through 50c. Further, no color filter is provided correspondingly to the sub-pixel 50d, and consequently, the sub-pixel 50d is arranged to display white or black (or the color therebetween) by the electrophoretic particles.

Further, regarding the selection switches 90a through 90d, as shown in FIG. 7, it is arranged that; only the external input switch 7 of the sub-pixel 50a corresponding to the red color filter is selected by the first selection switch 90a, only the external input switch 7 of the sub-pixel 50b corresponding to the green color filter is selected by the second selection switch 90b, only the external input switch 7 of the sub-pixel 50c corresponding to the blue color filter is selected by the third selection switch 90c, and only the external input switch 7 of the sub-pixel 50d is selected by the fourth selection switch 90d.

According to such a configuration, in the case in which two kinds of white and black electrophoretic particles are used, by providing the reversing mechanism such as the switch (not shown) for reversing the polarity of the applied voltage described above, totally eight colors, namely red (R), green (G), blue (B), a color between R and G, a color between G and B, a color between B and R, white and black as the colors of the electrophoretic particles, can be displayed by the sub-pixels 50a through 50d.

Therefore, in the display device, when performing the direct input via the external input switches 7, by appropriately selecting the selecting switches 90a through 90d, the additional display such as an underline or a note to the ordinary display can be performed with a desired color.

Further, it is obvious that regarding the ordinary display, display with various colors based on the eight colors described above can also be performed.

Figure 9:
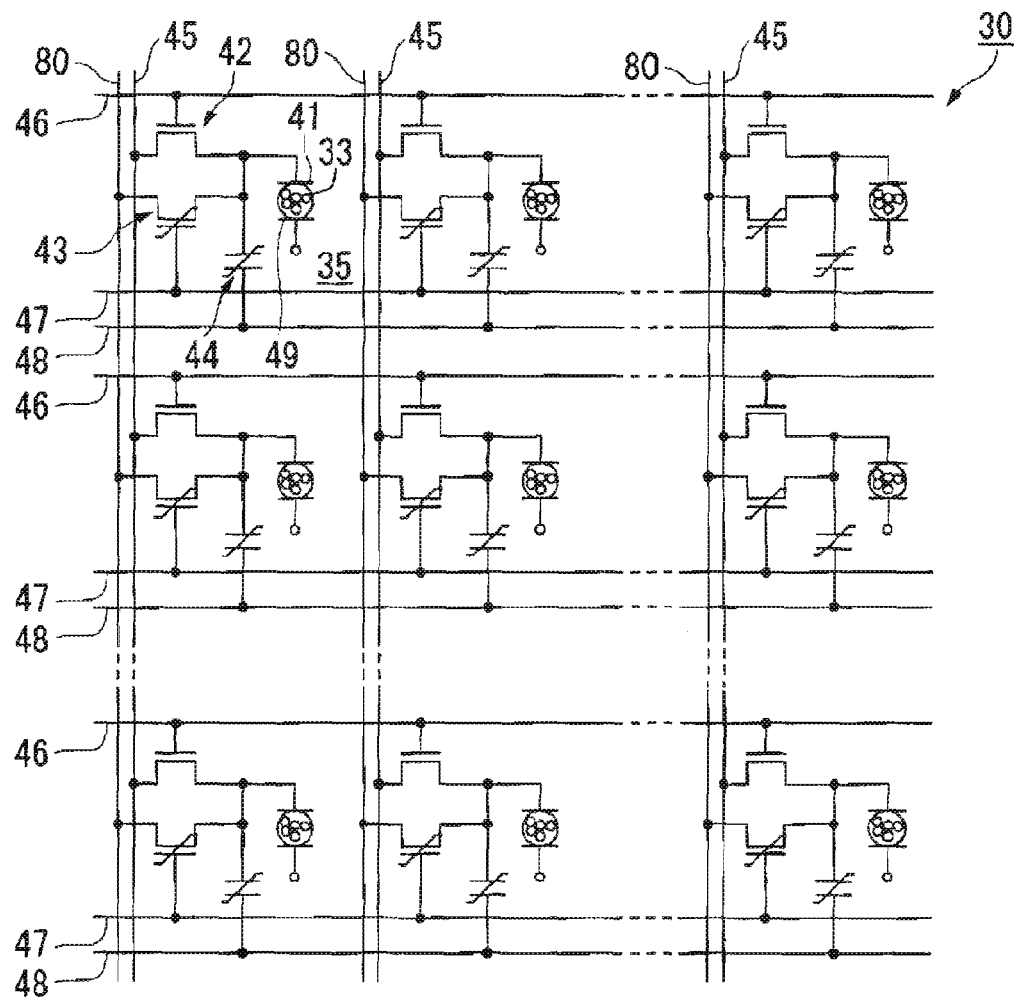
FIG. 9 is an equivalent circuit diagram of a display device shown in FIG. 10.
Figure 10:
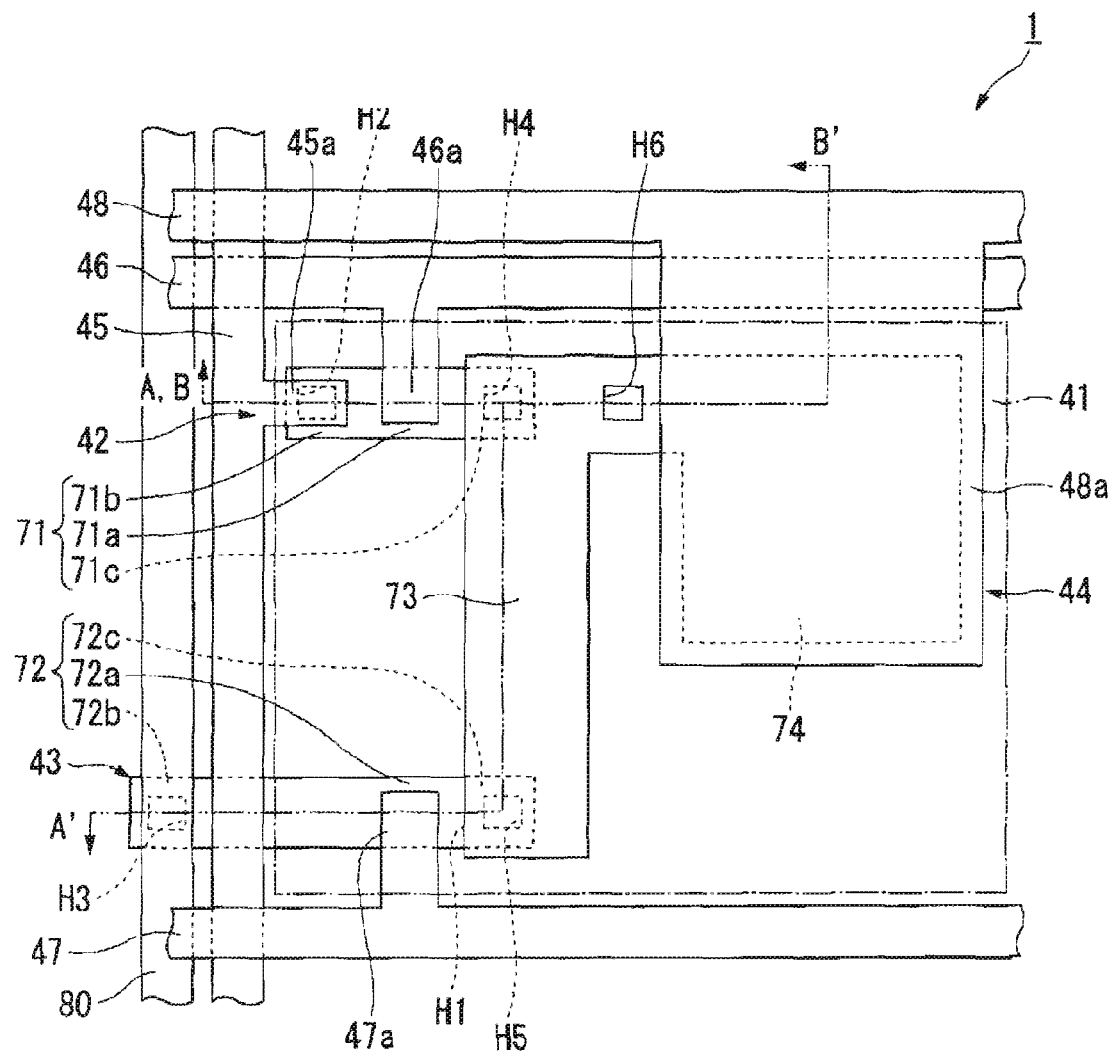
FIG. 10 is a plan view showing a substantial part of a pixel area.
Figure 11A:
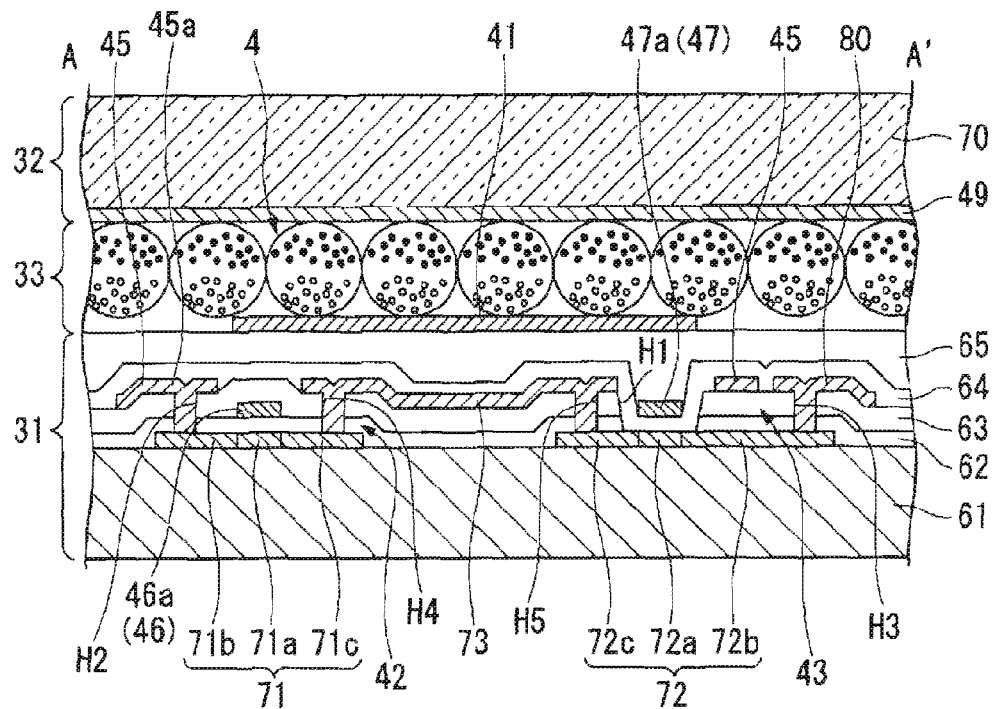
FIG. 11A is a cross-sectional diagram viewed along the arrowed line A-A' in FIG. 10.
Figure 11B:
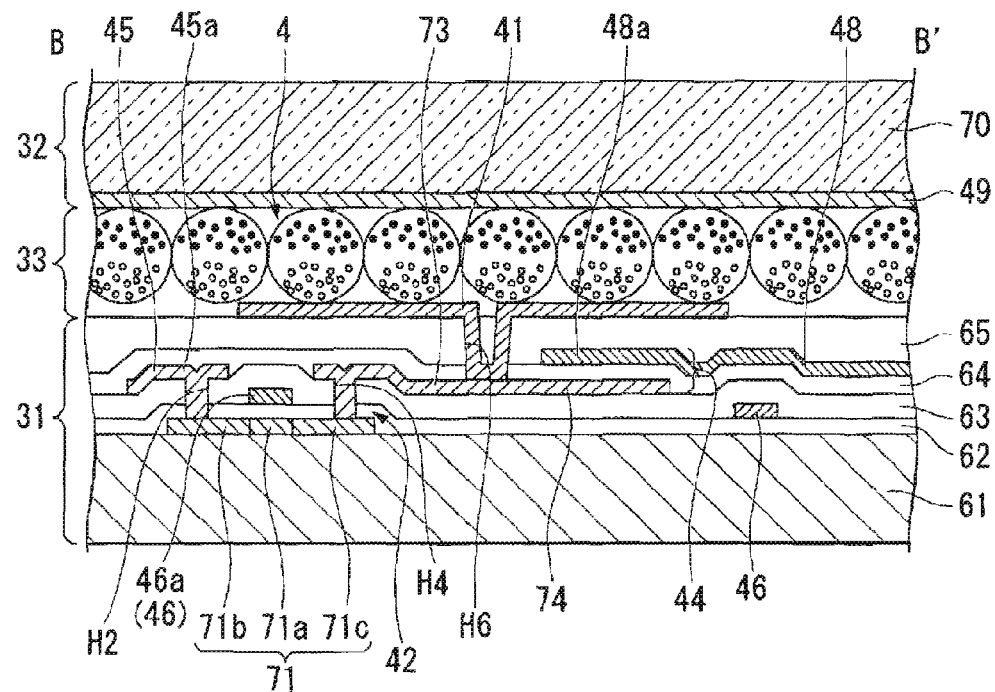
FIG. 11B is a cross-sectional diagram viewed along the arrowed line B-B' in FIG. 10.

Hereinafter, a display device according to a third embodiment of the invention will be described with reference to FIGS. 8, 9, 10, 11A, and 11B. It should be noted that FIG. 8 is a schematic side cross-sectional view of the display device, FIG. 9 is an equivalent circuit diagram of the display device, FIG. 10 is a plan configuration diagram showing the pixel area of the display device, FIG. 11A is a cross-sectional view along the A-A' arrowed line in FIG. 10, and FIG. 11B is a cross-sectional view along the B-B' arrowed line in FIG. 10.

The display device according to the third embodiment is different from the display device according to the first embodiment mainly in that the external input switches using piezoelectric elements are adopted as the pressure-sensitive switching elements forming the external input switches 7 instead of the microelectromechanical switches.

Figure 8:
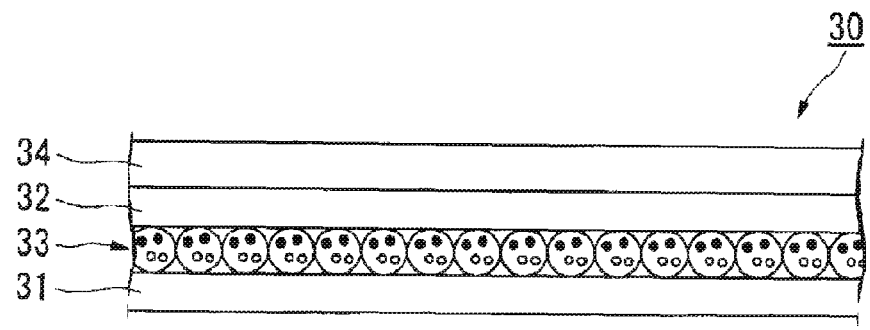
FIG. 8 is a schematic cross-sectional view of a display device according to a third embodiment of the invention.

As shown in FIG. 8, the display device according to the present embodiment is provided with an element substrate 31 as an active matrix substrate, a transparent substrate 32 disposed so as to be opposed to the element substrate 31, and an electrophoretic layer 33 held between the element substrate 31 and the transparent substrate 32. Here, the display device 30 has an outer surface (the side distant from the electrophoretic layer 33) of the transparent substrate 32 as the display surface. Further, the display device 30 is provided with a protective film 34 for covering entire surface of the outer surface of the transparent substrate 32.

Further, the display device 30 has an image display area inside the area in which the electrophoretic layer 33 is formed.

Still further, as shown in FIG. 9, in the image display area of the display device 30, there is disposed a plurality of pixels (not shown) in a matrix, and each of the pixels is composed of, for example, three sub-pixels 35 adjacent to each other.

Each of the plurality of sub-pixels 35 is provided with a pixel electrode 41, a selection switching element 42 formed of a TFT for performing switching control of the pixel electrode 41, and the external input switch 43 formed of a piezoelectric element. Further, in the image display area, there are disposed in a lattice, selection lines 80, a plurality of data lines (signal lines) 45, scan lines 46, polarization processing lines 47, and capacitance lines 48.

The selection switching element 42 has a source connected to the data line 45, a gate connected to the scan line 46, and a drain connected to the pixel electrode 41. Further, the external input switch 13 has a similar configuration to that of the selection switching element 42, and has a source connected to the selection line 80, a gate connected to the polarization processing line 47, and a drain connected to the pixel electrode 41. Further, a holding capacitance 44 is provided so as to be connected in parallel to a capacitive component formed between the pixel electrode 41 and the common electrode 49, and has a configuration for holding an image signal and a signal responsive to the direct input.

The data lines 45 have a configuration of supplying the image signals supplied from a drive circuit (the control section) not shown provided outside the image display area to each of the sub-pixels 35. Further, the scan lines 46 have a configuration of supplying scan signals supplied from the drive circuit to a pixel area 15. Further, the selection lines 80, similarly to the case with the embodiment described above, have a configuration of selectively supplying the selection data signals by an on/off operation of the selection switches (not shown) connected to the selection lines 80 via a connection wiring (not shown). Further, the capacitance lines 48 connect the holding capacitances 44 each provided to respective one of the pixel areas 15. Further, the polarization processing lines 47 connect the gates of the external input switches 43 each provided to respective one of the pixel areas 15.

Then, a detailed configuration of the display device 30 will hereinafter be explained with reference FIGS. 10, 11A, and 11B. It should be noted that FIGS. 10, 11A, and 11B show one example of the configuration of the sub-pixel 35, and the arrangement of the components can appropriately be modified in accordance with the design. Here, the transparent substrate 32 is omitted from the illustration in FIG. 10. Further, in FIG. 10, it is assumed that a direction along one side of the sub-pixel 35 having a substantially rectangular planar shape is an X axis direction, and a direction along another side thereof perpendicular thereto is a Y axis direction.

The element substrate 31 is provided with a substrate main body 61, a gate insulating film 62, an interlayer insulating film 63, a piezoelectric/ferroelectric film (a piezoelectric film, a ferroelectric film) 64, and a protective film 65 formed, sequentially on the inner side (the side of the electrophoretic layer 33) of the substrate main body 61. Further, the element substrate 31 is provided with semiconductor layers 71, 72 disposed on the inner surface of the substrate main body 61, the scan lines 46 disposed on the inner surface of the gate insulating film 62, the data lines 45 disposed on the inner surface of the interlayer insulating film 63, the connection electrode 73 and a capacitance electrode (one of capacitance electrodes) 74, the polarization processing lines 47 and the capacitance lines 48 disposed on the inner surface of the piezoelectric/ferroelectric film 64, and the pixel electrodes 41 disposed on the inner surface of the protective film 65.

The substrate main body 61 is similar to the substrate 2a in the embodiment described above.

The gate insulating film 62 is made of an insulating material such as $SiO_2$ (silicon dioxide), and is formed so as to cover the semiconductor layers 71, 72 formed on the substrate main body 61.

The interlayer insulating film 63 is made of an insulating material such as $SiO_2$ (silicon dioxide) or $SiN_x$ (silicon nitride), and is formed so as to cover the gate insulating film 62 and the scan lines 46 formed on the gate insulating film 62.

The piezoelectric/ferroelectric film 64 is formed of a ferroelectric made of an organic material with a piezoelectric effect such as a copolymer (permittivity of e.g., 6 through 13, piezoelectric constant of e.g., 0.32 through 0.38 Vm/N) of vinylidene fluoride (VDF) and trifluoroethylene (TrFE). Further, the piezoelectric/ferroelectric film 64 is formed so as to cover the data lines 45, the selection lines 80, the connection electrodes 73, and the capacitance electrode 74. Further, the piezoelectric/ferroelectric film 64 covers a channel region 72a described later of the semiconductor layer 72 via a contact hole H1 penetrating the gate insulating film 69 and the interlayer insulating film 63.

The protective film 65 is made, for example, of acrylic, and is formed so as to cover the polarization processing lines 47 and the capacitance lines 48 formed on the piezoelectric/ferroelectric film 64.

As shown in FIGS. 10, 11A, and 11B, the semiconductor layer 71 is formed so as to include an area overlapping the scan line 46 in a plan view via the gate insulating film 62, and is made of an inorganic semiconductor such as polysilicon. Further, the semiconductor layer 71 is provided with a channel region 71a in an area overlapping the scan line 46 in a plan view via the gate insulating film 62. Further, the semiconductor layer 71 is provided with a source region 71b and a drain region 71c formed by implanting impurity ions into polysilicon. The selection switching element 42 is composed using the semiconductor layer 71 as a main part.

It should be noted that a lightly-doped drain (LDD) structure having a highly-doped region with a relatively high impurity concentration and a lightly-doped region with a relatively low impurity concentration are respectively formed in the source region 71b and the drain region 71c of the semiconductor layer 71 can be adopted to the selection switching element 42.

Similarly to the semiconductor layer 71, the semiconductor layer 72 is formed including an area overlapping the polarization processing line 47 in a plan view via the gate insulating film 62, and is made of inorganic semiconductor such as polysilicon. Further, the semiconductor layer 72 is provided with a channel region 72a in an area overlapping the polarization processing line 47 in a plan view via the piezoelectric/ferroelectric film 64. Further, the semiconductor layer 72 is provided with a source region (one doped region) 72b and a drain region (the other doped region) 72c formed by implanting impurity ions into polysilicon. The external input switch 43 is composed using the semiconductor layer 72 and the piezoelectric/ferroelectric film 64 as a main part.

It should be noted that the LDD structure can also be adopted to the external input switch 43 similarly to the case with the selection switching element 42.

The scan line 46 is disposed along a direction (the Y axis direction) of one side of the pixel area 15 having a rectangular planar shape, and is made of a metal material such as Al (aluminum). Further, the scar, line 46 is provided with a branch section 46a overlapping the channel region 71a in a plan view via the gate insulating film 62 and functioning as the gate electrode.

The data line 45 is disposed along a direction (the X axis direction) of one side of the pixel area 15 having a rectangular planar shape, and is made of a metal material such as Al/Cu (copper). Further, the data line 45 is provided with a branch section 45a overlapping the source region 71b of the semiconductor 71 in a plan view via the gate insulating film 62 and the interlayer insulating film 63. The branch section 45a is connected to the source region 71b of the semiconductor layer 71 via the contact hole H2 penetrating the gate insulating film 62 and the interlayer insulating film 63.

Further, the selection line 80 is made of the same metal material as the data line 45, and is connected to the source region 72b of the semiconductor layer 72 via a contact hole H3 penetrating the gate insulating film 62 and the interlayer insulating film 63. It should be noted that similarly to the case with the embodiment described above, the selection switch (not shown) is connected to the selection line 80 via the connection wiring (not shown).

The connection electrode 73 is made of a metal material such as Al/Cu. Further, the connection electrode 73 is connected to the drain region 71c of the semiconductor layer 71 via a contact hole H4 penetrating the gate insulating film 62 and the interlayer insulating film 63, and also to the drain region 72c of the semiconductor layer 72 via a contact hole H5 penetrating the gate insulating film 62 and the interlayer insulating film 63.

The capacitance electrode 74 is formed integrally with the connection electrode 73, and overlaps a branch section 48a described later of the capacitance line 48 via the piezoelectric/ferroelectric film 64.

The polarization processing line 47 is disposed along a direction (the Y axis direction) of one side of the sub-pixel 35 in a plan view, and is made of a metal material such as Ag or Ni, or an electron conductive polymeric material such as polyaniline. Since the data line 45 is a wiring having direct contact with the organic piezoelectric/ferroelectric film, a method not causing a thermal process damage such as plasma to the ferroelectric surface, namely a liquid-phase deposition method such as a plating method, an inkjet deposition, or a spin coating method is suitable for a deposition method of the material forming the wiring. Further, the polarization processing line 47 is provided with a branch section 47a overlapping the channel region 72a of the semiconductor layer 12 in a plan view via the piezoelectric/ferroelectric film 64 and functioning as the gate electrode. Further, the polarization processing line 47 has a configuration of performing a polarization processing of the piezoelectric/ferroelectric film 64 forming the external input switch 43 in each of the sub-pixels 35 by applying a voltage.

The capacitance line 48 is disposed along the Y axis direction of the sub-pixel 35 in a plan view, and is made of the same material as the polarization processing line 47. Further, the capacitance line 48 is provided with a branch section (the other of the capacitance electrodes) 48a overlapping the capacitance electrode 74 in a plan view via the piezoelectric/ferroelectric film 64. Further, the holding capacitance 44 is composed of the capacitance electrode 74, the piezoelectric/ferroelectric film 64, and the branch section 48a.

The pixel electrode 41 is made of a metal material such as Cu, and has a substantial rectangular planar shape. It should be noted that as the material of the pixel electrode, in addition to metal such as Al, Au (gold), Ag, Pt (platinum), Ni (nickel), or Sn (tin) or alloys thereof, conductive oxides such as indium tin oxide (ITO), electron conductive polymers such as polyaniline, or ion conductive polymers dispersing ionic material such as NaCl, $LiClO_4$, or KCl in a matrix resin such as polyvinyl alcohol resin or polycarbonate resin can also be used.

Further, the pixel electrode 41 is connected to the connection electrode 73 via a contact hole H6 penetrating the piezoelectric/ferroelectric film 64 and the protective film 65. Thus, the pixel electrode 41 is electrically connected to the drain region 71c of the semiconductor layer 71 and the drain region 72c of the semiconductor layer 72.

Incidentally, as shown in FIGS. 10, 11A, and 11B, the transparent substrate 32 is provided with a substrate main body 70 and a common electrode 49 stacked on the surface of the substrate main body 70 on the side of the electrophoretic layer 33.

The substrate main body 70 is substantially the same as the transparent substrate 3a in the embodiment described above, and is provided with a color filter correspondingly to each of the sub-pixels 35 or to each of the pixels according to needs.

Similarly to the case with the embodiment described above, the electrophoretic layer 33 has a configuration in which a number of microcapsules 4 are arranged densely.

An operation of the display device 30 having the configuration described above will hereinafter be explained.

Firstly, a normal image display method will be explained. When the scan signal is input from the scan line 46 by the drive circuit (the control section) disposed outside the image display area, the selection switching element 42 becomes in an on-state for a predetermined period. Then, when the image signal is input to the selection switching element 42 thus becoming in the on-state, the image signal is written to the pixel electrode 41. The image signal thus written thereto is retained between the pixel electrode 41 and the common electrode 49. Therefore, when the image signal causing the pixel electrode 41 to become positive, and the common electrode to become negative is input, the positively charged black electrophoretic particles 52 forming the electrophoretic layer 33 migrate to the common electrode 49. Thus, the black display of the pixel area 15 is performed. According to the above operation, the normal image display is performed.

On this occasion, since the electrophoretic layer 33 has display retainability, the display condition of the pixel area 15 is retained. Therefore, once a desired display is performed, there is no need for supplying power until other display is performed, the display state Is retained until the signal is supplied again. Further, the image signal input to the pixel electrode 41 is held by the holding capacitance 44. It should be noted that by inputting a reverse voltage between the pixel electrode 41 and the common electrode 49, namely a signal causing the pixel electrode 41 to become negative and the common electrode 49 to become positive, the display state of the image is canceled.

Then, another image display method by a direct input of an underline or a note in addition to the normal image display will be explained. When pressure is applied to the pixel area (the sub-pixels 35) from the side of the transparent substrate 32 with, for example, a pen, charge is caused in the piezoelectric/ferroelectric film 64 by piezoelectric conversion. Thus, the external input switch 43 becomes in the on-state for a predetermined period. Then, when the signal is input to the external input switch 43 thus becoming in the on-state from the selection line 80, the signal is written to the pixel electrode 41. Thus, the black display of the sub-pixel 35 to which the pressure is applied is performed. According to the above operation, the other image display by the direct input is performed.

It should be noted that also in the present embodiment, by appropriately turning on/off the selection switches connected to the selection lines 80, the gray-scale of writing by the external input can be set.

Subsequently, a method for reading the image in the sub-pixels 35 will be explained. When a readout signal as a pulse signal is input from the capacitance line 48 towards the holding capacitor 44, the signal thus input is output to the outside from the data line 45 via the holding capacitance 44 and the selection switching element 42. In this case, by inputting the scan signal to the selection switching element 42 from the scan line 46 in accordance with input of the readout signal, the selection switching element 42 disposed to the sub-pixel 35 to which the readout signal is input is set to the on-state. Here, the intensity of the readout signal thus output varies in accordance with an amount of charge (direction of the polarization) held by the holding capacitance 44. According to the above operation, the display state of the sub-pixels 35 can be read out from the outside.

In the display device with such a configuration, in particular, by using the piezoelectric/ferroelectric film 64 as the piezoelectric film for forming the external input switch 43 and also as the ferroelectric film for forming the holding capacitance 44, both of them can be formed in the same process. Further, by forming the piezoelectric/ferroelectric film 64 with an organic material, an inexpensive liquid-phase process can be applied, thus achieving the manufacturing cost reduction, and at the same time, the low-temperature process can be used in comparison with the case of forming it with an inorganic material.

An electronic paper according to an embodiment of the invention will hereinafter be explained.

Figure 12:
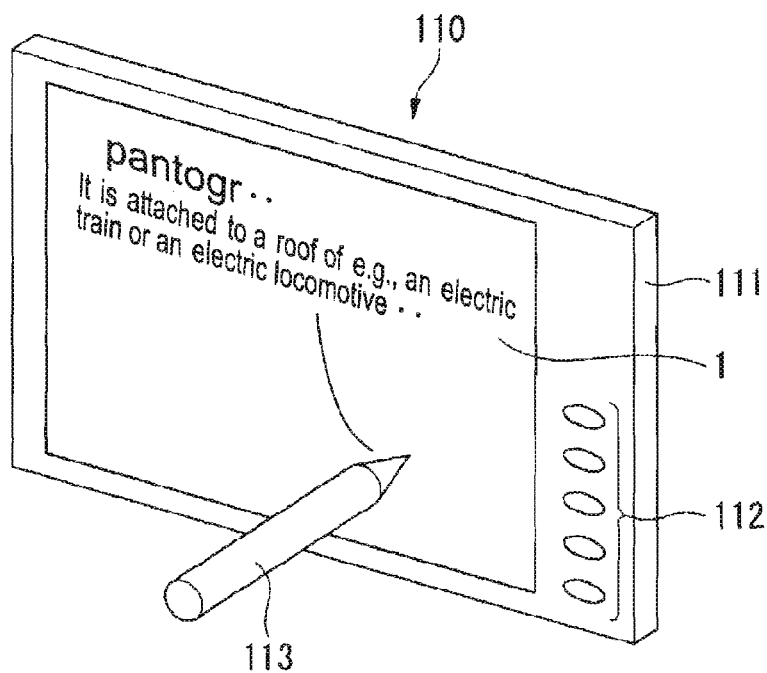
FIG. 12 is a perspective view showing a schematic configuration of an electronic paper according to an embodiment of the invention.

FIG. 12 is a perspective view showing one aspect of an electronic paper according to an embodiment of the invention. The electronic paper 110 is composed of a display unit 1 formed of the display device described above, a main body section 111, an operation section 112, and so on.

The electronic paper 110 is a so-called "painting board" which displays data and so on in a built-in storage section on the display unit 1, and allows the user to add a desired content with a pen 113 in a condition in which the data is kept displayed. Further, the operation section 112 includes the all clear button and the partial erase button described above.

Such an electronic paper 110 is suitable for sales people to make a presentation of an item in a small sales negotiation, and it is possible to make an explanation adding emphasis to an appeal point of the item while showing the catalog of the item, for example.

Figure 13:
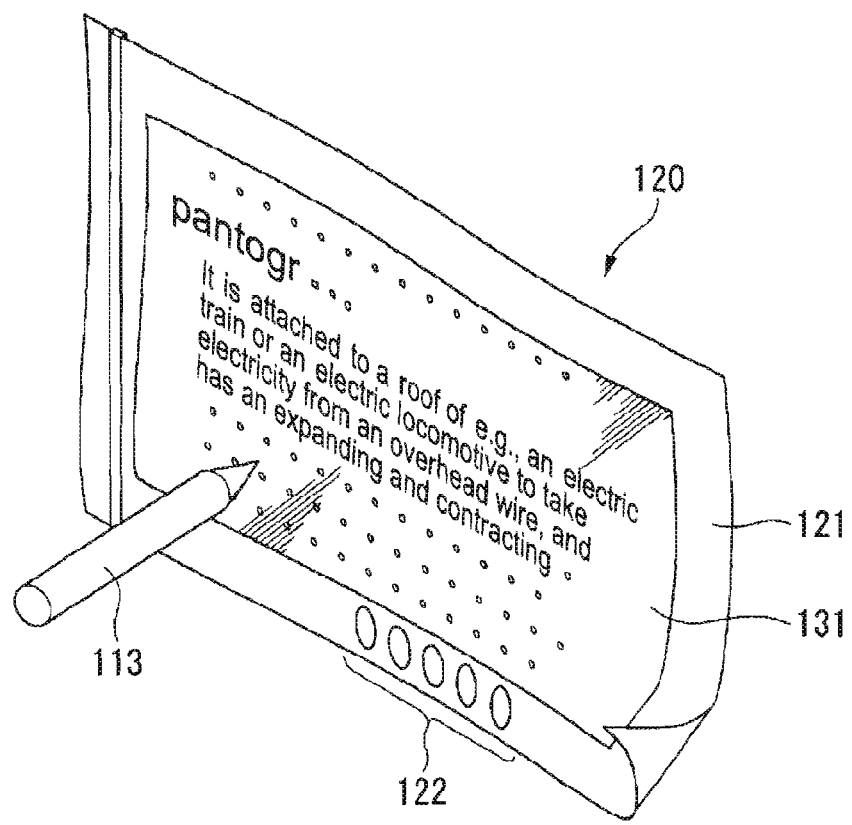
FIG. 13 is a perspective view showing a schematic configuration of an electronic paper according to another embodiment of the invention.

FIG. 13 is a diagram showing an electronic paper 120 according to another aspect of the invention. The electronic paper 120 is mainly composed of a display unit 131 having the substrate 2a of the display device 1 described above formed of a flexible material, a main body section with flexibility identical to the display unit, and an operation section 122 formed of a plurality of membrane switches. It should be noted that in forming the substrate 2a with the flexible material such as polyolefin resin, technologies described in, for example, JP-A-10-125929 and JP-A-10-125931 applied by the assignee of the present patent application can preferably be used.

The operation section 122 includes the all clear button and the partial erase button and so on described above, desired functions can be realized by pressing the buttons with the pen 113 or a finger. Further, the plurality of buttons can be formed with the external input switches 7. In this case, a necessary number of external input switches are formed on the peripheral section of the display unit 131 using the process described above.

The form of the electronic paper 120 is similar to paper, and can be formed to have a thickness of, for example, no larger than 1 mm. Therefore, it is light and easy to hold, and is superior in usability such that it can be brought in a thin paper folder, and taken out at a scene where it is required and used for an explanation while marking an important point on the scene.

According to such electronic papers 110, 120, writing by a direct input is possible as described above, it becomes possible to cope with low power consumption and growth in size, and further, it becomes possible to use a pen requiring no power or the like and capable of simple pressurization as the wiring pen.

It should be noted that as an application of the display device according to the embodiment of the invention, in addition to the electronic paper described above, for example, an apparatus equipped with a display section such as an electronic notebook, an electronic book, a personal computer, or a cellular phone can be cited.

Further, the display device according to the invention is not limited to the embodiments described above, but various modifications can be made within the spirit or the scope of the invention. For example, although in the embodiment the protective film 19 is adhered to the outer surface of the transparent substrate 3 for the purpose of protection of the microcapsules 4, the invention is not limited thereto, the attachment of the protective film 19 can be eliminated providing the strength of the transparent substrate 3 is sufficient.

Further, although the microcapsules 4 encapsulating the electrophoretic dispersion liquid are used in the embodiment, it is also possible to directly hold and encapsulate the electrophoretic dispersion liquid between the substrates without using the microcapsules 4.

Further, although the display device using the electrophoretic elements as the display elements forming the pixels is exemplified in the embodiments, the invention can be applied to a display device using other display elements than the electrophoretic elements providing the display elements have retainability of the display. The invention can also be applied to, for example, a display device formed of liquid crystal elements using cholesteric liquid crystal, a display device formed of electrochromic elements using oxidation-reduction reaction, and further, a display device formed of elements performing display by reversing particles with two different colors, and so on.

Figure 14:
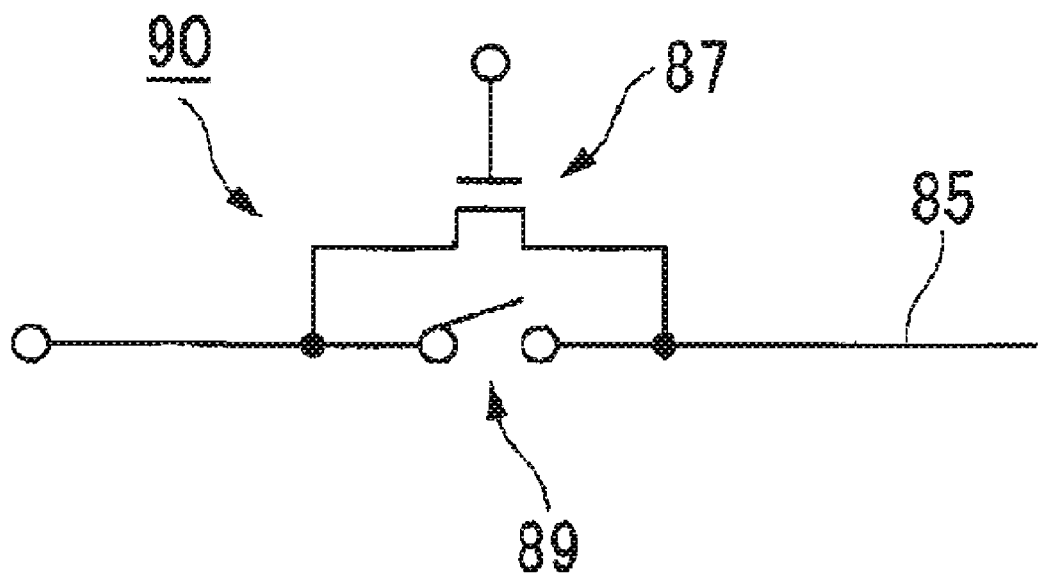
FIG. 14 is a schematic diagram showing another example of a selection switch.

Further, as the selection switch 90 (90a, 90b, 90c), it is also possible to build into the structure similarly to the selection switching elements 5 and so on in the pixel area, as shown in FIG. 14 for example, instead of forming only of mechanical switch sections as described above. In other words, it is possible that the source side and the drain side of the TFT element section 87 are connected to the connection wiring 85, and a mechanical switch 89 is connected between the source side and the drain side. By configuring as described above, in addition to the on/off operation of the selection switch 90 by the mechanical switch 89, the on/off operation of the selection switch 90 can also be performed electrically by the TFT element section 87.

Further, the number of the sub-pixels forming the pixel 50 is not limited to three, but can be two or larger than three. In this case, the number of selection lines and the number of selection switches are obviously changed correspondingly to the number of sub-pixels.

Further, although the TFT elements are used as the selection switching elements, other elements such as thin film diodes (TFD) can also be used providing the element performs the switching control of the pixel electrode.

What is claimed is:

1. A display device for an active matrix drive, comprising:
   a plurality of pixels each having display retainability and including a first sub-pixel through an nth sub-pixel, n being a natural number greater than 1;
   a selection switching element provided correspondingly to each of the sub-pixels, connected to a data line, and for selecting the corresponding sub-pixel; and
   an external input switch provided correspondingly to each of the sub-pixels, connected to a selection line, and for supplying a signal from the selection line to the corresponding sub-pixel in response to an input operation from the outside,
   wherein the selection line includes n kinds of selection lines, from a first selection line connected to the first sub-pixel to an nth selection line connected to the nth sub-pixel, and
   the n kinds of selection lines are connected to selection switches for one of selecting the selection lines individually and selecting two or more of the selection lines in a lump.

2. The display device according to claim 1, wherein the sub-pixels display different colors from each other.

3. The display device according to claim 1, wherein the external input switch is a pressure-sensitive switching element.

4. The display device according to claim 3, wherein the pressure-sensitive switching element is a microelectromechanical switch.

5. The display device according to claim 1, wherein the selection switch is a pressure-sensitive switching element.

6. The display device according to claim 3, wherein the display device has a microcapsule encapsulating an electrophoretic dispersion liquid held between a pair of substrates, and a protective film attached to an outer surface of a display side substrate out of the pair of substrates.

7. An electronic paper comprising a display device according to claim 1.

* * * * *